United States Patent [19]

Tadokoro et al.

[11] Patent Number: 4,926,636
[45] Date of Patent: May 22, 1990

[54] ENGINE-CONTROL APPARATUS

[75] Inventors: Tomoo Tadokoro; Seiji Tashima; Haruo Okimoto; Toshimichi Akagi; Masami Nakao; Ikuo Matsuda; Einosuke Suekuni, all of Hiroshima, Japan

[73] Assignee: Mazda Motor Corporation, Hiroshima, Japan

[21] Appl. No.: 309,847

[22] Filed: Feb. 14, 1989

[30] Foreign Application Priority Data

Feb. 18, 1988 [JP] Japan .................. 63-34037

[51] Int. Cl.$^5$ .................. F02B 27/02; F02B 75/10
[52] U.S. Cl. .................. 60/312; 60/602; 74/860; 123/357; 123/564; 181/232; 181/236; 181/254; 192/0.07; 192/0.073; 192/0.096
[58] Field of Search .................. 60/312, 602, 603; 123/357, 419, 436, 564; 74/645; 192/0.07, 0.073, 0.075, 0.092, 0.096; 181/232, 236, 254

[56] References Cited

U.S. PATENT DOCUMENTS 4,461,257 7/1984 Hosaka .................. 123/436
4,467,673 8/1984 Hamada .................. 192/0.096
4,665,692 5/1987 Inaba .................. 181/239

FOREIGN PATENT DOCUMENTS 36-58611 4/1961 Japan.
229622 10/1986 Japan .................. 192/0.096

OTHER PUBLICATIONS

Abstract of Japanese Patent Publication No. 74325/1984.

Primary Examiner—Douglas Hart
Attorney, Agent, or Firm—Wegner & Bretschneider

[57] ABSTRACT

Disclosed is an engine-control apparatus in which an exhaust passageway of the engine is provided with plural sound deadening passages. A portion of the plural sound deadening passages is designed to be opened or closed by a shift valve on the basis of a predetermined switching characteristic, and the pressure of the exhaust gases is changed upon the switching of the shift valve. In order to prevent torque shock to the driven wheels which may occur attendant upon operation of the shift valve to open or close or in order to reduce probability that torque shock would occur, there is provided a torque regulating apparatus which permits an adjustment of torque generator by the engine, of a transmission efficiency of power to the driven wheel, or of a switching speed at which the shift valve is switched to open or close, or a change in the switching characteristic.

21 Claims, 20 Drawing Sheets

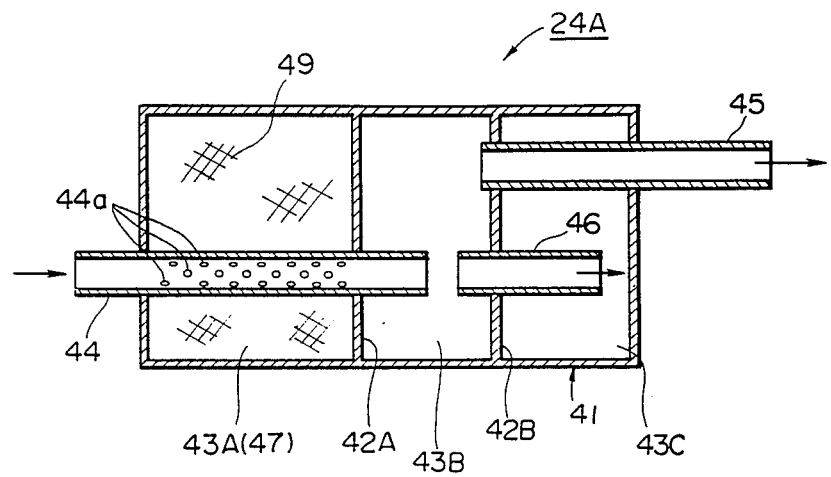
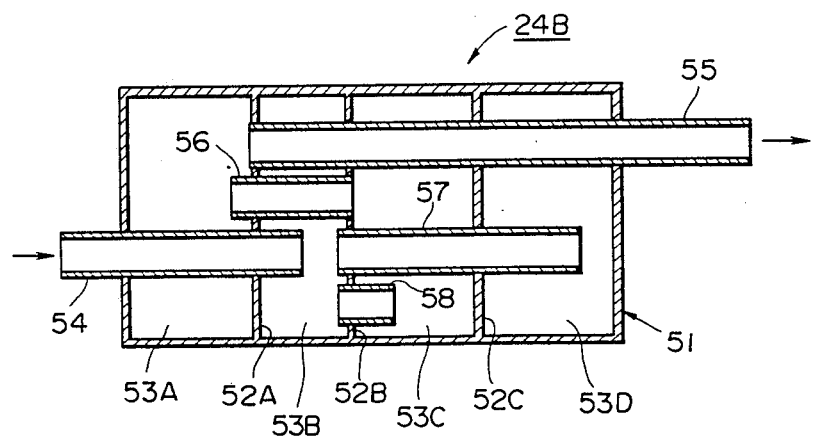

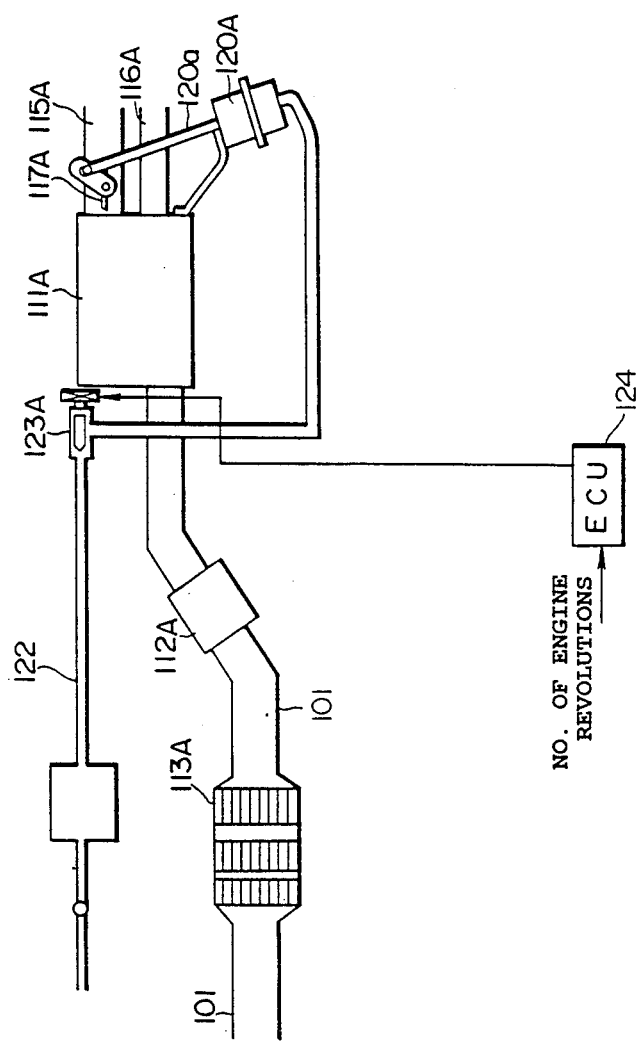

ENGINE-CONTROL APPARATUS

BACKGROUND OF THE INVENTION

1. Field of the Inventin

The present invention relates to an engine-control apparatus.

2. Related Art

In order to reduce sounds that arise upon discharge of the burnt exhaust gases from the engine, a muffler or a silencer is connected to an exhaust passageway. The sounds that generates from the engine may be classified roughly into two types: one type being a sound which is generated by a flow of the exhaust gases to a remarkable extent at the time of high output of the engine where the pressure of the exhaust gases, namely, the exhause pressure, is increased and which gets lower as the exhaust pressure is increased and the other type being a sound which is generated to a remarkable extent at the time of low output of the engine and which gets lower as the exhaust pressure is decreased. It is thus to be noted that either of the two types of the sounds is enlarged in such a state of running where the other type is reduced. Accordingly, the sound caused by the exhaust gases cannot be reduced efficiently using one muffler or silencer because one of the two types of the sounds is generated to a greater extent in a situation whee the other is lowered. Recently, there is an increasing trend that a plurality of mufflers or silencers are mounted on the exhaust passageway so as to operate a shift valve to open or close at least a portion of the sound deadening passageway.

For example, Japanese Patent Publication (kokai) No. 74,325/1984 discloses a system in which plural mufflers or silencers different in characteristics from each other are connected to an exhaust passageway in such a manner that a flow of the exhaust gases to at least a portion of the plural silencers is switched by a shift valve. More specifically, the exhaust passageway is branched into a first branch exhaust passageway and a second branch exhaust passageway, both serving as sound deadening passages, the first branch exhaust passageway being mounted with a first silencer designed to be used exclusively at the time of low rotational speeds of the engine while the second branch exhaust passageway being mounted with a second silencer designed to be used exclusively at the time of high rotational speeds thereof. The shift valve mounted on the exhaust passageway is furthermore designed to switch the flow of the exhaust gases in accordance with engine load in such a manner that the exhaust gases flow through the first branch exhaust passageway at the time of the low engine load while they flow through the second branch exhaust passageway at the time of the high engine load.

Furthermore, Japanese Utility Model Publication (kokai) No. 58,611/1986 discloses an exhaust system in which one silencer or muffler is provided with two exhaust outlet tubes different in diameter from each other, with a shift valve mounted on the large-diameter exhaust outlet tube. The shift valve is operated to close the large-diameter exhaust outlet tube at the time of low rotational speeds of the engine where an amount of the flow of the exhaust gases is small, on the one hand, thereby flowing the exhaust gases merely through the small-diameter exhaust outlet tube. It is operated to open the large-diameter exhaust outlet tube at the time of high rotational speeds thereof where an amount of the flow of the exhaust gases is large, on the other hand, thus capable of flowing the exhaust gases through both the large-diameter and small-diameter exhaust outlet tubes.

It should be noted, however, that the pressure of the exhaust gases change to a considerably great extent as the sound deadening passages are switched by the shift valve leading to a great change in torque generated by the engine and causing a torque shock. As a change of torque occurs against the driven wheels, the change of torque may be perceived as a considerably large degree of shock against the vehicle body itself.

SUMMARY OF THE INVENTION

Therefore, the present invention has the first object to provide an engine-control apparatus adapted to prevent a large degree of shock from occurring upon the switching of the shift valve, in which a flow of the exhaust gases is shifted by a shift valve mounted on an exhaust passageway thereby deadening the sound effectively.

The present invention further has the second object to provide an engine-control apparatus adapted to reduce a frequency of opportunities that a large degree of shock occurs upon the switching of the shift valve, in which a flow of the exhaust gases is shifted by the shift valve mounted on the exhaust passageway to effectively deaden the sound arising from the engine.

In order to achieve the first object, the present invention basically consists of an engine-control apparatus comprising: a plurality of sound deadening passages mounted on an exhaust passageway of the engine; a shift valve mounted on the exhaust passageway and adapted to switch a flow of exhaust gases between a first state and a second state by changing the flow of exhaust gases through at least a portion of the plurality of the sound deadening passages, the first state being a state in which at least pressure of the exhaust gases is decreased and the second state being a state in which the pressure of the exhaust gases is increased; a switching control means for controlling the switching of the shift valve on the basis of a predetermined switching characteristic in accordance with a state of running the engine; and a torque regulating means for regulating a change in torque to be transmitted to a driven wheen at the time of switching the shift valve by the switching control means.

With the above arrangement, the engine-control apparatus according to the present invention prevents the occurrence or the feel of a large degree of torque shock while effectively deadening the sound generated by the engine.

The torque regulating means is designed to regulate a change in torque generated by the engine at the time when the shift valve is switched. In other words, when the pressure at which the exhaust gases are discharged is switched from the first state to the second state, namely, when the torque generated by the engine is decreased, on the one hand, the torque regulating means is operated so as to increase the torque to be generated by the engine. When the exhaust pressure is switched from the second state to the first state, namely, when the torque generated is increased, on the other, the torque regulating means is opearted so as to decrease the torque to be generated. The control of the torque to be generated by the engine may be carried out, for instance, on the basis of charging pressures, spark timings, amounts of fuel to be fed, and so on.

The torque regulating means may be designed so as to vary a switching speed at which the shift valve is switched from an open state to a closed state or vice versa. More specifically, a degree of torque shock may be decreased by gradually changing the pressures of the exhaust gases discharged as the switching speed of the shift valve is delayed. In this case, it is not advantageous to delay the switching speed of the exhaust gases too much from the viewpoint of responsiveness to the switching of the shift valve so that the switching speed may be conveniently delayed as the degree of torque shock is being increased or as the torque shock is being felt, using as a parameter a degree of throttle opening, a change rate at which the speed of changing the degree of throttle opening is changed, speed ranges of the transmission, or the like.

Furthermore, the torque regulating means may be designed such that an efficiency of transmitting torque from the engine to the driven wheen is reduced. As the most effective means in this case is a torque converter with a lockup clutch fitted in a driving system in such a manner that the lockup clutch is released at the time when the shift valve is switched. This arrangement allows no large degree of shock to occur even if a change in torque generated by the engine would occur at the time of the switching of the shift valve because the torque, even if changed, is reduced to a sufficient level and then transmitted to the driven wheel.

For the torque regulating means using the lockup clutch, if the lockup clutch already complies with releasing conditions under which the lockup clutch is released at the time of switching the shift valve, that is, if the lockup clutch has already been released on the basis of predetermined lockup characteristics at the time of switching the shift valve, other techniques may be adopted to prevent torque shock more effectively. More specifically, there may be regulated a change in torque to be generated by the engine, the shifting speed of the shift valve or other means.

In order to achieve the second object, the present invention basically consists of an engine-control apparatus comprising: a plurality of sound deadening passages mounted on an exhaust passageway of the engine; a shift valve mounted on the exhaust passageway and adapted to switch a flow of exhaust gases between a first state and a second state by changing the flow of exhaust gases through at least a portion of the plurality of the sound deadening passageways, the first state being a state in which at least pressure of the exhaust gases is decreased and the second state being a state in which the pressure of the exhaust gases is increased; a switching control means for controlling the switching of the shift valve on the basis of a predetermined switching characteristic in accordance with a state of running the engine; and a switching regulating means for regulating the switching of the shift valve prior to the predetermined switching characteristic in accordance with a state in which the vehicle runs.

It is noted that, although the above arrangement is not intended to reduce shock itself at the time of switching the shift valve, it serves as reducing opportunities of the switching of the shift valve prior to the predetermined characteristic as less as possible, in a state of running the vehicle where shock should be particularly disliked. For instance, the lower the speed range sought to be shifted the greater torque shock. If the speed range sought is a low speed range, a range in which the shift valve is switched to open or to close may be changed in such a manner that opportunities of switching the shift valve are getting smaller as compared with the high speed range. More specifically, if a number of engine revolutions is set as a parameter for switching characteristics of the shift valve, the number thereof at the time of switching the shift valve is set larger at the time of the low speed range than that at the time of the high speed range. In the most extreme case, the switching of the shift valve may be prohibited.

BRIEF DESCRIPTION OF THE DRAWINGS

FIGS. 2 and 3 each is a cross-sectional view showing an example of a silencer of muffler different in characteristics from each other.

FIG. 25 is a schematic diagram showing a fundamental portion of a variant of an exhaust passageway.

DETAILED DESCRIPTION OF THE PREFERRED EMBODIMENTS

The present invention will be described more in detail by way of examples in conjunction with the drawings attached hereto.

Figure 1:
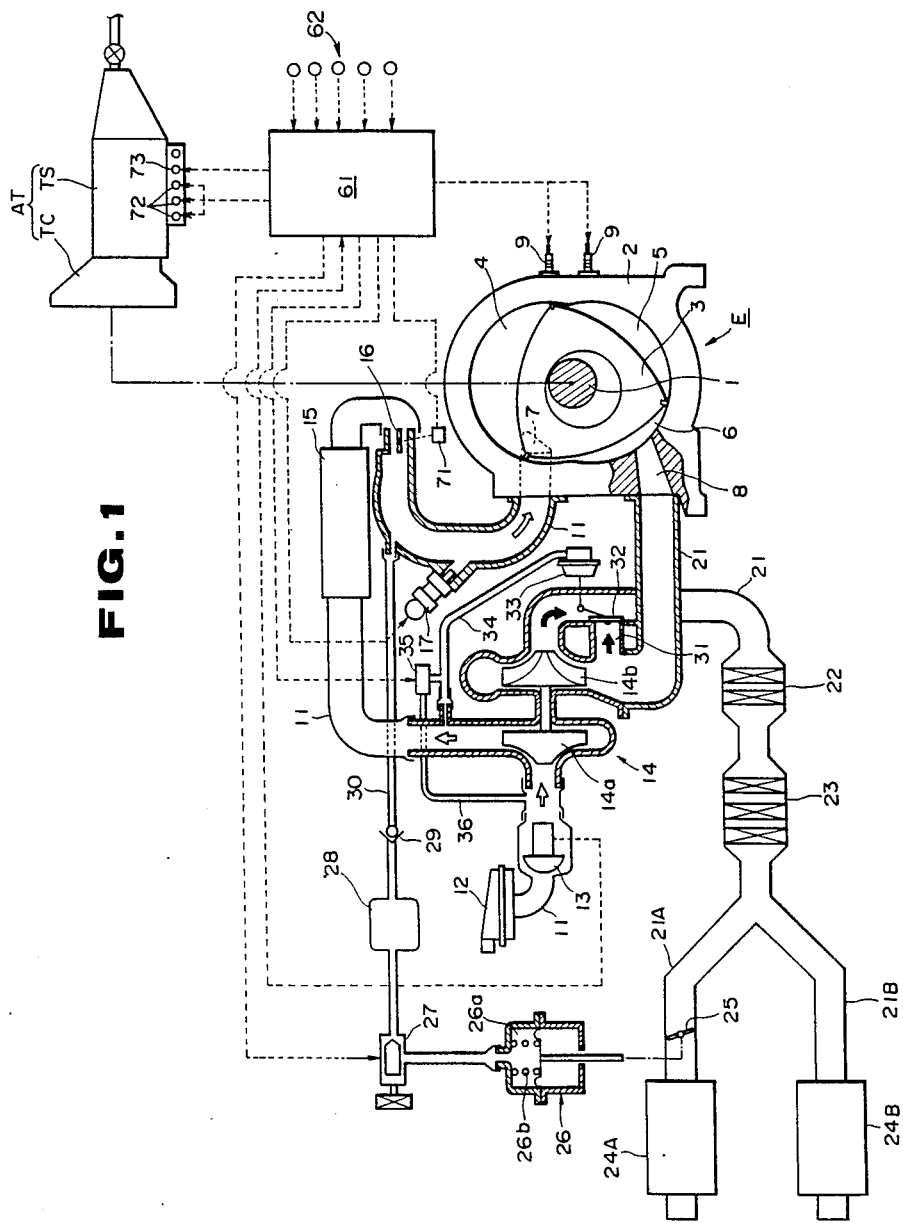
FIG. 1 is a schematic view showing an outline of one example of the engine-control apparatus according to the present invention.

Referring to FIG. 1, an engine E is shown to be a rotary piston engine of the Wankel type, which comprises a casing 2 and a rotar 3 of a virtually triangular shape mounted in the casing 2 in such a manner that the rotar 3 separates and divides the casing 2 into three operating chambers 4, 5, and 6, each of which is changed in volume by a planetary rotation of the rotar 3. The casing 2 is provided at predetermined positions with an intake port 7 and an exhaust port 8 and mounted with a spark plug 9, thereby allowing each of the operating chambers 4, 5, and 6 to carry out steps of intaking air, compressing, exploding and withdrawing in this order.

Power taken from an output shaft 1 of the engine E is transmitted through an automatic transmission AT to driven wheels (not shown). The automatic transmission AT comprises a torque converter TC with a lockup clutche, namely, a lockup torque converter, and a multi-stage transmission mechanism TS of a planetary gearset type.

The intake port 7 is communicated through an air intake passageway 11 with an air cleaner 12. Downstream of the air cleaner 12 is disposed an air flowmeter 13 which in turn is connected to a compressor wheel 14a of a supercharger 14 through the air intake passageway 11. Downstream of the compressor wheel 14a is disposed an intercooler 15 which is then connected to a throttle valve 16. A fuel injection valve 17 is disposed on the air intake passageway 11 downstream of the throttle valve 16.

The exhaust port 8 is communicated through an exhaust passageway 21 with a turbine wheel 14b of the supercharger 14 which is disposed upstream of an oxidizable catalyst 22. Downstream of the oxidizable catalyst 22 is arranged a ternary catalyst 23 on the exhaust passageway 21. The exhaust passageway 21 is branched at a position downstream of the ternary catalyst 23 into two branch exhaust passageways, a first branch exhaust passageway 21A and a second branch exhaust passageway 21B. To the first branch exhaust passageway 21A is connected to first silencer 24A, and to the second branch exhaust passageway 21B is connected a second silencer 24B.

The first branch exhaust passageway 21A is provided with a shift valve 25 at a position upstream of the first silencer 24A, thereby allowing the exhaust gases to flow only through the second branch exhaust passageway 21B and the second silencer 24B when the shift valve 25 is closed, on the one hand, and to flow through both the first and second exhaust passageways 21A and 21B and both the first and second silencers 24A and 24B, respectively, when the shift valve 25 is open, on the other hand. In other words, the pressure of the exhaust gases is lowered when the shift valve 25 is held open while the pressure thereof is increased when the shift valve 25 is closed. In this specification, a state in which the pressure is lowered as the shift valve 25 is open is sometimes called a first state, while a state in which the pressure is increased by closing the shift valve 25 is sometimes called a second state.

In this embodiment, the shift valve 25 is operated to open or close by driving an actuator 26 of a hydraulically operable type. The actuator 26 comprises a pressure chamber 26a that is connected through a three-way solenoid valve 27 to a vacuum tank 28. The vacuum tank 28 is then connected to a check valve 29 disposed in a negative pressure introducing passageway 30 that is communicated with the intake passageway 11 at a position downstream of the throttle valve 16. This arrangement permits a communication of the pressure chamber 26a of the actuator 26 with the vacuum tank 28 when the three-way solenoid valve 27 is excited, thereby closing the shift valve 25. When the three-way solenoid valve 27 is deenergized, air is introduced into the pressure chamber 26a releasing the negative pressure therein, thereby opening the shift valve 25 via a return spring 26b mounted in the pressure chamber 26a of the actuator 26.

The exhaust passageway 21 is provided with a bypass path 31 by-passing the turbine 14b of the supercharger 14, and the bypass path 31 is provided with a waste gate valve 32 that is designed so as to determine a charging pressure, namely, a maximum degree of pressure, at the time when the shift valve 25 is open, using an actuator 33 of the type operable hydraulically. The actuator 33 is designed such that its pressure chamber is connected through an inlet path 34 to the air intake passageway 21 at a position downstream of the compressor 14a of the supercharger 14. The inlet path 34 is provided on the way with a duty solenoid valve 35 and is connected to the air intake passageway 21 at a position upstream of the compressor 14a. The duty solenoid valve 35 in turn is connected through an ambient pressure introducing passageway 36 to a path upstream of the air flowmeter 13 and downstream of the compressor 14a of the supercharger with the purpose to change the maximum charging pressure by altering a ratio of a degree of opening of the intake passageway 21 upstream of the compressure to a degree of opening thereof downstream thereof, namely, a duty ratio.

The first silencer 24A is set for high speed ranges, namely, high rpm ranges, primarily in order to reduce the sound of a flow of the exhaust gases, i.e., the sound of the first type as classified above. As shown in FIG. 2, the first silencer 24A comprises a casing 41 which in turn is divided into and defines three separate chambers 43A, 43B and 43C disposed in a series in this order from the upstream side to the downstream side. The first chamber 43A is separated from the second chamber 43B with a first partition wall 42A and the second chamber 43B is separated from the third chamber 43C with a second partition wall 42B. The casing 41 is provided at a forward wall portion thereof with an exhaust inlet pipe 44 communicating the exhaust passageway 21 with the second chamber 43B and passing through the first chamber 43A to the second chamber 43B, thus leading the exhaust gases directly to the second chamber 43B. The casing 41 of the first silencer 24A is further provided at a rearward wall portion with an exhaust outlet pipe 45 communicating the second chamber 43B with the first branch exhaust passageway 21 and passing through the third chamber 43C, thus allowing the exhaust gases once led in the second chamber 43B to be discharged again into the first branch exhaust passageway 21A. The first chamber 43A is filled with glass wool 49 and the exhaust inlet pipe 44 is provided with a number of small holes 44a over a length of the first chamber 43A through which portions of the exhaust gases can penetrate into the first chamber 43A. A third pipe 46 is further disposed coaxially with the axis of the exhaust inlet pipe 44 in order to communicate the second chamber 43B with the third chamber 43C.

The second silencer 24B is set for low speed ranges, namely, low rpm ranges, primarily in order to reduce the sound likely to occur particularly at the time of low engine revolutions, i.e., sound of the second type as classified above. Turning now to FIG. 3, the second silencer 24B is designed to comprise a casing 51 with four separate chambers separated into each with a partition wall. A first chamber 53A arranged at an inlet side of the casing 51 is separated with a first partition wall 52A from a second chamber 53B that in turn is separated from a third chamber 53C with a second partition wall 52B. The third chamber 53C is then separated with a third partition wall 52C from a fourth chamber 53D arranged at an outlet side of the casing 51. An exhaust inlet pipe 54 penetrates a forward wall of the casing 51 passing through the first chamber 53A from the second branch exhaust passageway 21B and leading directly to the second chamber 53B, and an exhaust outlet pipe 55 is disposed passing through the three chambers 53B, 53C, and 53D and penetrating a rearward wall of the casing 51 so as to communicate the first chamber 53A with the second branch exhaust passageway 21B. The first chamber 53A is further disposed to be communicated with the third chamber 53C through a pipe 56 passing through the second chamber 53B. The second chamber 53B is arranged to be communicated with the third chamber 53C through a pipe 58 and with the fourth chamber 53D through a pipe 57 that is disposed coaxially with the axis of the exhaust inlet pipe 54 and that passes through the third chamber 53C.

With the arrangement the first silencer 24A is designed so as to have a smaller resistance of the exhaust gases than the second silencer 24B.

Turning back to FIG. 1, a control unit 61 using a microcomputer is designed so as to input signals from sensors or switches sensing or switching various signals, for example, signals of an intake air amount from the air flowmeter 13. These sensors are to sense information necessary for various control and they are referred to generally as a group of sensory 62 in this embodiment.

The control unit 61 provides outputs to the spark plug 9, the fuel injection valve 17, the three-way solenoid valve 27, the duty solenoid valve 35, the actuator 71, and solenoids 72 and 73 for transmission and lockup, respectively. The actuator 71 comprises a stepping motor, for example, for driving the throttle valve 16.

Figure 4:
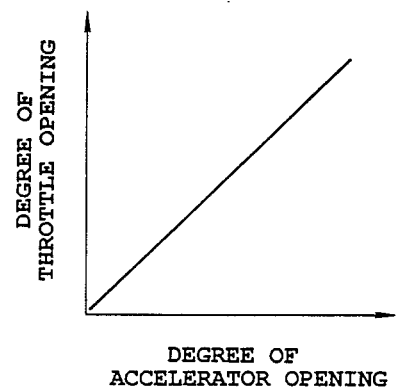
FIG. 4 is a view showing a basic throttle characteristic.

The control unit 61 is further designed so as to regulate a spark timing, an amount of fuel to be injected (an air-to-fuel ratio), the switching of the shift valve 25, a charging pressure, a degree of opening of the throttle valve 16, and the shifting of speed ranges (including lockup). The control unit 61 is to regulate the actuator 71 so as to offer throttle characteristics as shown in FIG. 4.

Figure 5:
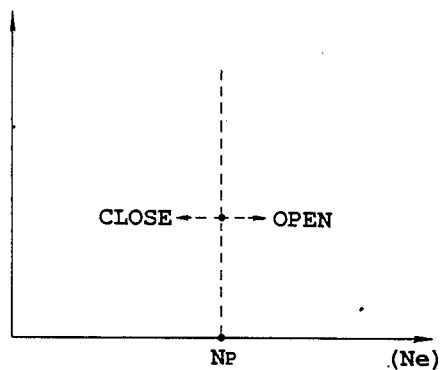
FIG. 5 is a view showing an example of setting a number of revolutions at the time of the switching.

The control unit 61 is also designed so as to regulate the operation of the shift valve 25 to open or close in accordance with shift characteristics set in advance. In this embodiments, a number of revolutions of the engine is set as a parameter for one of the shift characteristics. As shown in FIG. 5, for example, the number of engine revolutions to be switched, Np, may be set in a range between 2,500 rpm and 4,000 rpm. When the number of engine revolutions exceeds the set number of engine revolutions to be switched, Np, namely, when a revolution number switch contained in a group of the sensors 62 is turned on, the shift valve 25 is opened, on the one hand, while when the number of engine revolutions is smaller than the set number of engine revolutions, Np, namely, when the revolution number switch is turned off, the shift valve 25 is operated to close.

The description will now be made on a prevention of torque shock that may occur following a regulation of the control unit 61, namely, when the shift valve 25 is switched.

Change in Torque Generated by Engine (FIGS. 6–11)

In this embodiment, the torque generated by the engine is changed at the time of switching the shift valve by adjusting charging pressures, spark timings or amounts of fuel to be fed.

1. Adjustment of Charging Pressures (FIGS. 6–9)

The control unit 61 controls the charging pressures to decrease by a predetermined amount when the pressures of the exhaust gases, namely, the exhaust pressures, are decreased by switching the shift valve 25 from the closed state to the open state. When the exhaust pressures are increased by switching the shift valve 25 from an open state to a closed state, the charging pressures are increased by a predetermined amount.

Figure 6:
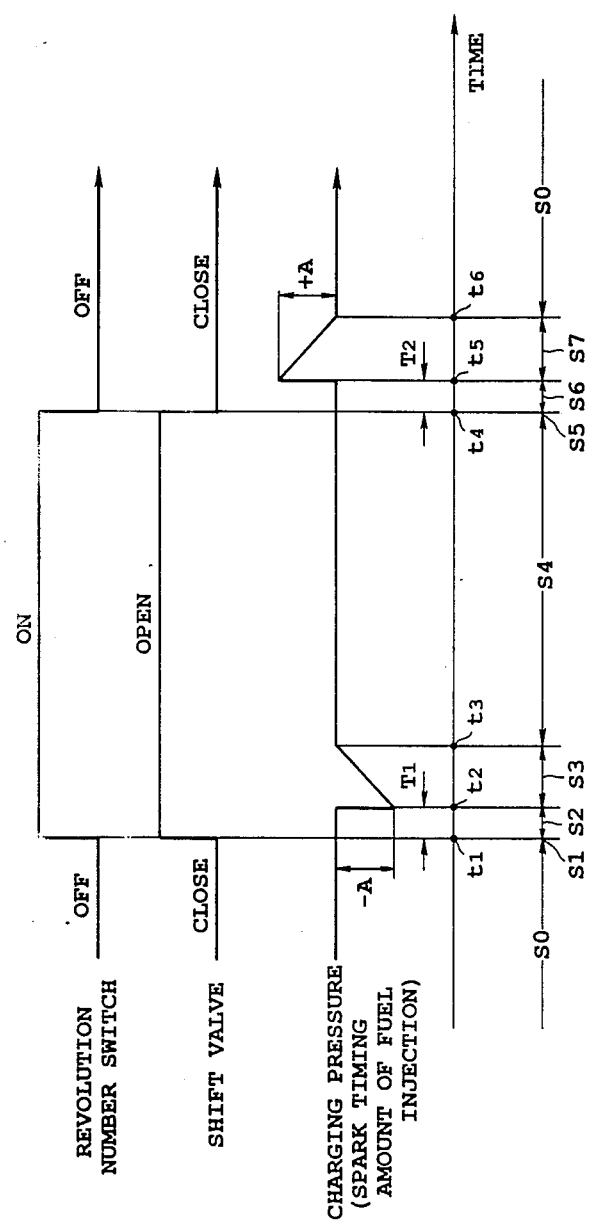
FIG. 6 is a time chart showing a control example of the present invention.

Referring to FIG. 6, the revolution number switch is OFF in the stage S0 ranging up to the point of time, t1, where the shift valve 25 is in a closed state. At the stage S1 when the time is t1, the switch is turned ON and at the same time the shift valve 25 is operated to open. In the stage S2 ranging from the point of time t1 when the shift valve 25 has been opened to the time, which continues a predetermined period of time, T1, the charging pressure is maintained at the same level as that at the time of ordinary running, that is, at the stage S0. At the point of time t2 as the predetermined time period T1 elapses from the point of time, t1, the charging pressure is allowed to drop straight down by a predetermined amount, -A, for example, by 400 mmHg. This prevents torque shock that may occur in association with the switching of the shift valve 25 from the closed state to the open state. The drop of the charging pressure after the time period T1 has elapsed is made with responsiveness taken into consideration. Then in the stage S3 after the time t2 up to the time t3, the charging pressure is increased gradually to return at the point of time t3 to the same level as that in the stage S0. In the stage S4 after the point of time, t3, the revolution number switch is turned ON to operate the shift valve 25 to open and this open state is maintained in a stable manner. At the stage S5 when the time is t4, the switch is turned OFF and the shift valve 25 is simultaneously operated to close. The stage S6 continues for a predetermined period of time T2 ranging from the time t4 to the time t5 and, at the point of time, t5, the charging pressures are allowed to increase by a predetermined amount, +A, for example, 400 mmHg, in order to prevent torque shock attendant upon the switching of the shift valve 25. At the stage S7 ranging from the time t5 to the time t6, the increased pressures are gradually decreased and returned to the original pressure at the point of time, t6. The stage is also returned ot the original stage S0 at the point of time t6. In the stage S0, the revolution number switch is kept OFF and the shift valve 25 is maintained in the closed state in a stable manner.

Figure 7:
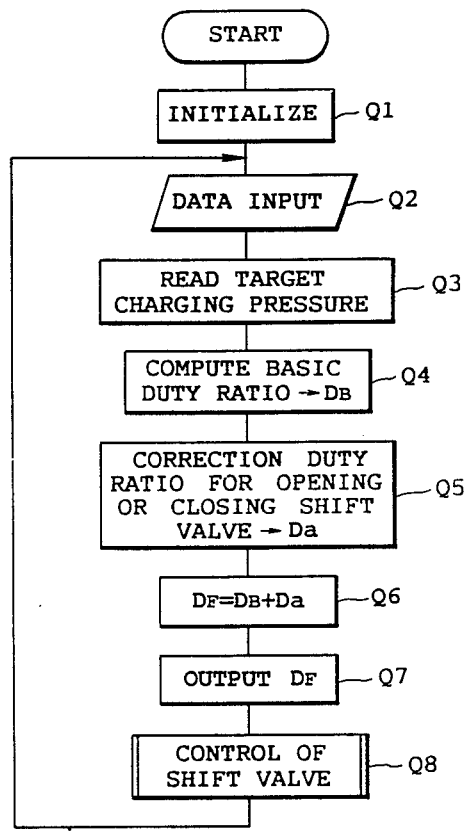
FIG. 7 is a flowchart showing a control example in which torque generated by the engine is changed by adjustment of charging pressures.
Figure 8:
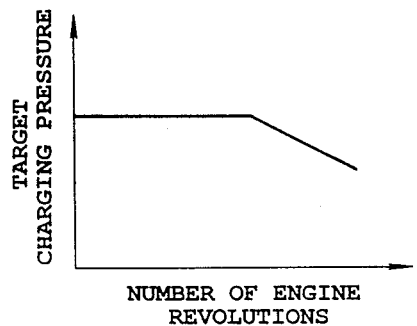
FIG. 8 is a graph showing a map to be used for the control of FIG. 7.
Figure 9:
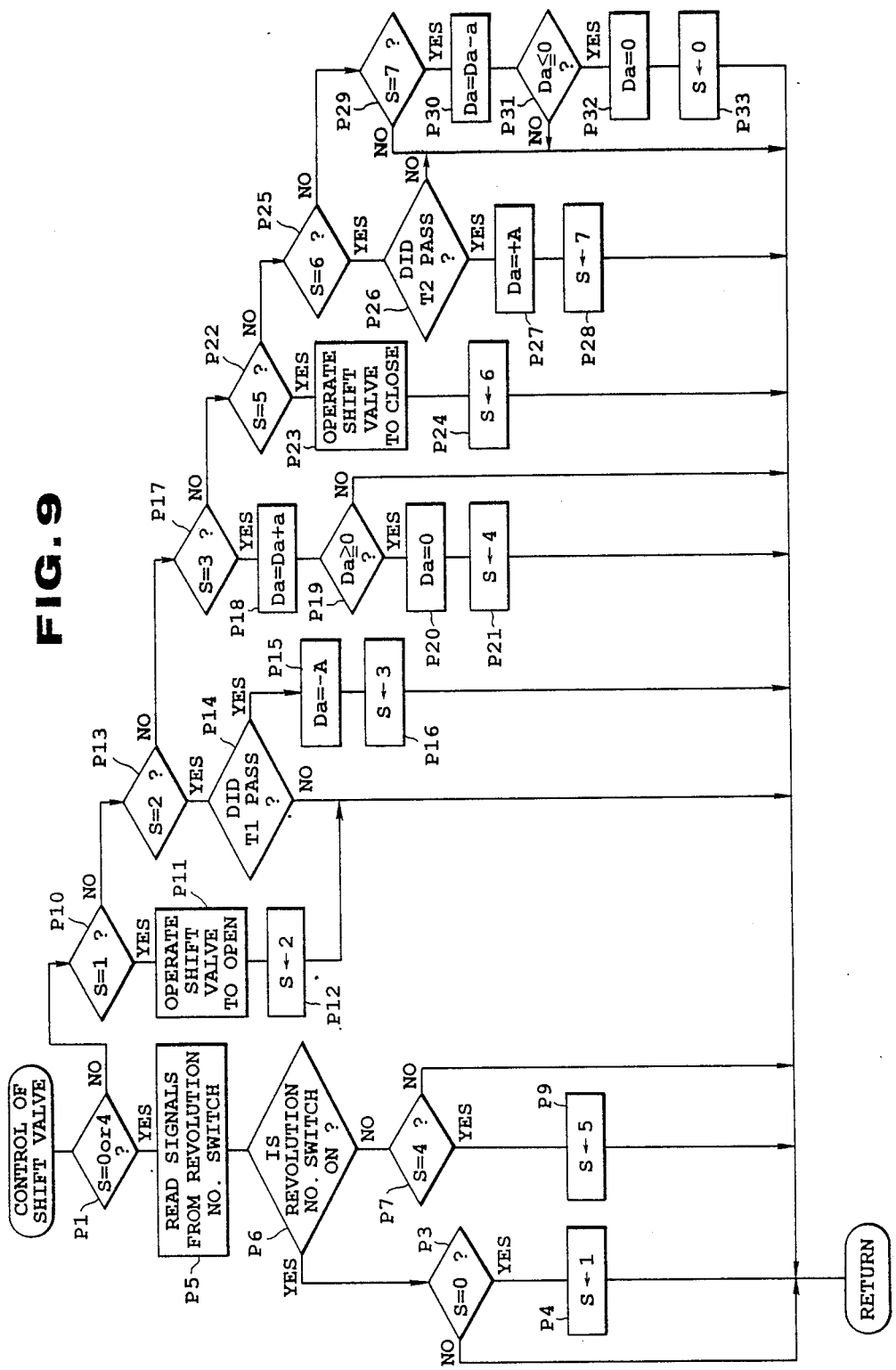
FIG. 9 is a flowchart showing a control content in common when the torque generated by the engine is changed.

The torque generated by the engine by adjusting the charging pressures may be controlled using the control unit 61 in accordance with the flowcharts as shown in FIGS. 7 to 9.

As shown in FIG. 7, the system is initialized at step Q1 and signals from a group of sensors 62 are read in at step Q2. Thereafter, at step Q3, a target amount of charging pressures is read from a map as shown in FIG. 8, and a basic duty ratio DB is set at step Q4 so as to correspond to the target amount of the charging pressures.

Then at step Q5, a correction duty ratio Da is read for prevention of torque shock attendant upon the switching of the shift valve, which is determined at the time of the control of the shift valve as will be described hereinbelow. At step Q6, a final duty ratio DF is computed by adding the correction duty ratio Da to the basis duty ratio DB. Thereafter, the final duty ratio DF is fed to the solenoid 35 at step Q7 and the shift valve 25 is controlled at step Q8.

The control of the shift valve 25 at step Q8 will be described more in detail in conjunction with the flowchart of FIG. 9.

As shown in FIG. 9, it is distinguished at step P1 whether or not the current stage is S0 or S4. If YES at step P1, then a signal from the revolution number switch is read at step P5, and it is then distinguished at step P6 whether or not the switch is ON. If YES at step P6, it is further distinguished at step P3 whether the current stage is S0 or not. And if it is decided at step P3 that the stage is S0, the flow proceeds to step P4 where the stage is set to S1 in order to forcibly bring the time to the point of time, t1, as shown in FIG. 6, thereby forcibly switching the shift valve 25 to an open state. If NO at step P3, the flow is returned as it is because the shift valve 25 is in an open state. If it is decided at step P6 that the revolution number switch is turned OFF, then it is distinguished at step P7 whether the current stage is S4 or not. When it is decided at step P7 that the current stage is not S4, then the flow is returned as it is because the shift valve 25 is already in the closed state. When it is decided at step P7 that the current stage is S4, then the flow proceeds to step P9 and there the stage is set to S5 in order to operate the shift valve 25 to close.

If it is decided NO at step P1, then it is distinguished at step P10 whether or not the current stage is S1. If YES at step P10, the point of time is t1 and the shift valve 25 is operated toopen at step P11. Then flow then goes to step P12 where the stage is set to S2, and it is returned.

When it is decided at step P10 that the current stage is not S1, then the flow proceeds to step P13 and it is judged whether or not the current stage is S2. If it is decided YES at step P13, it is then distinguished at step P14 whether or not the predetermined period of time, T1, has elapsed, that is, it is confirmed whether or not the time has reached the point of time, t2, as shown in FIG. 6. If NO at step P14, the flow is returned. If YES at step P14, the time becomes t2 and, at step P15, a duty ratio Da is set so as to decrease the charging pressure by a predetermined amount of charging pressures, −A, in order to generate the duty ratio Da to the duty solenoid 35. The generation of the duty ratio Da to the duty solenoid 35 is carried out at every interrupt time setting. Then the flow proceeds to step P16 and the current stage is set to S3. The flow is then returned.

When it is decided at step P13 that the stage is not S2, the flow proceeds to step P17 where it is decided whether or not the current stage is S3. If YES at step P17, a duty ratio portion "a" to be increased at every installment to return to the original pressure level is added to the previously set duty ratio Da and a renewed duty ratio Da is set at step P18. Then at step P19, it is distinguished whether or not the renewed duty ratio Da is equal to or larger than zero in order to confirm whether the point of time, t3, has elapsed. If YES at step P19, the duty ratio is reset at zero at step P20 and the stage is set to S4 at step S21. Then the flow is returned.

If it is decided at step P17 that the stage is not S3, it is then distinguished at step P22 whether or not the stage is S5 in order to confirm whether the time raches the point of time, t4, as shown in FIG. 6. If YES at step P22, the shift valve 25 is operated to close at step P23 and the stage is set to S6 at step P24. Then the flow is returned.

If NO at step P22, the flow proceeds to step P25 and it is decided whether or not the stage is then S6. If YES at step P22, it is then confirmed at step P26 that the predetermined period of time T2 passed away, that is, it is decided whether the time runs to the point of time, t5, as shown in FIG. 6. If YES at step P26, then the flow goes to step P27 whether the duty ratio Da is set to raise the pressures by the predetermined amount, +A, and the stage is set to S7 at step P28. If NO at step P26, the flow is then returned.

If it is decided at step P25 that the stage is not S6, the flow advances to step P29 where it is decided whether or not the current stage is then S7. If NO at step P29, the flow is returned as it is. If it is decided at step P29 that the stage is S7, the duty ratio Da is renewed at step P30 by subtracting a duty ratio portion "a" from the previously set duty ratio Da at every installment in order to decrease the raised pressures at installments to the original pressure level. It is then decided at step P31 whether or not the duty ratio Da renewed is equal to or smaller than zero in order to confirm whether the point of time becomes t6, as shown in FIG. 6. If NO at step P31, the flow is then returned as it is. If YES at step P31, the duty ratio Da is reset to zero at step P32 and the stage is set to S0 at step P33. Then the system is returned.

2. Adjustment of Spark Timings (FIGS. 6, 9 & 10)

The torque generated by the engine may also be changed by adjusting spark timings at the time of the switching of the shift valve 25. The adjustment of the spark timings is basically made in substantially the same manner as the adjustment of the charging pressures. More specifically, it is noted that the predetermined amount of the pressures, +A or −A, to be increased or decreased, as shown in FIG. 6, correspond to an amount of a spark advance or of a spark delay for reduction in torque shock. And the duty ratio Da in FIG. 9 corresponds to an amount of the spark delay. It is noted herein that predetermined periods of time, T1 and T2, should be set in this case from the viewpoiint of responsiveness unlike the adjustment of the charging pressures.

The detail of the change in the torque generated by the engine by adjustment of the spark timings will be described in conjunction with the flowchart of FIG. 10.

Figure 10:
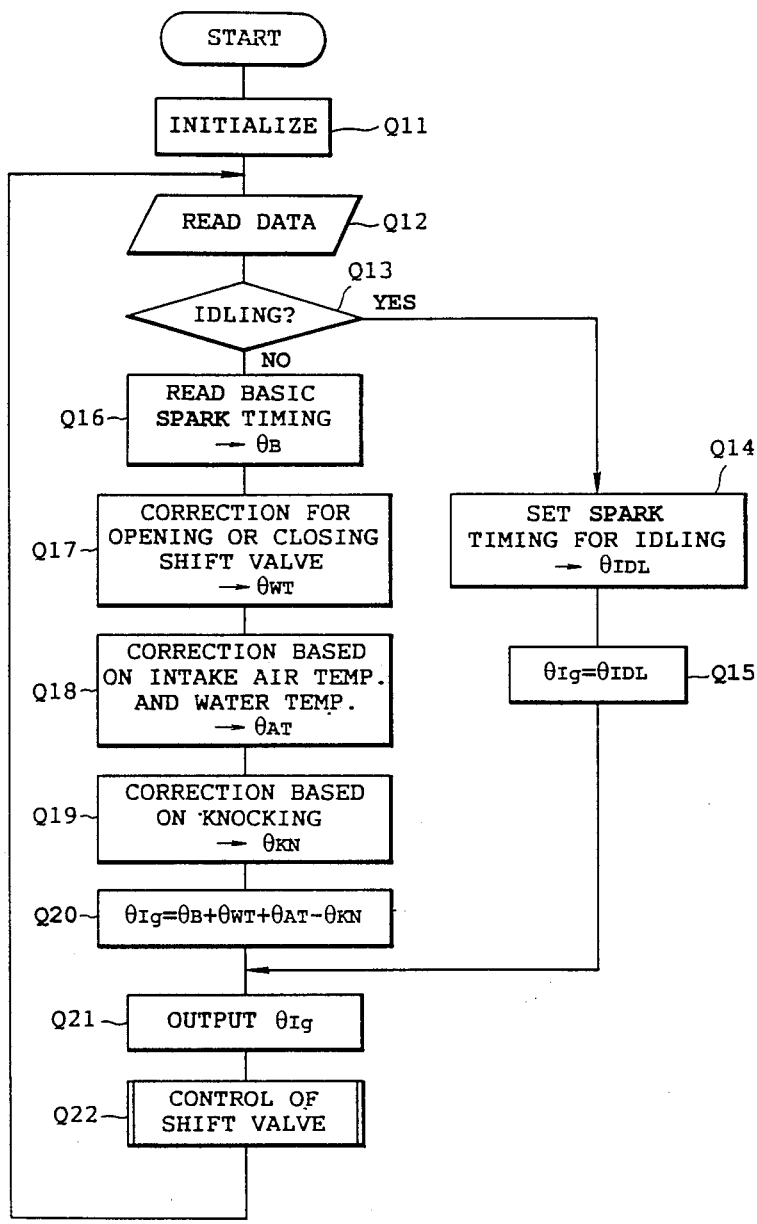
FIG. 10 is a flowchart showing a control example when the torque generated by the engine is changed by adjustment of spark timings.

As shown in FIG. 10, the system is initialized at step Q11 and signals from a group of sensors 62 are read in at step Q12. Then at step Q13, it is distinguished whether or not it is currently at the time of idling. Actually, the idling is decided when an idling switch is ON, namely, when the throttle valve is fully open, and when the number of engine revolutions is below a predetermined number of revolutions. If YES at step Q13, the flow proceeds to step Q14 where a spark timing, $\theta$IDL, for idling is read in from a table formed and stored in advance and the spark timing, $\theta$IDL, is set as a final spark timing, $\theta$Ig, at step Q15. Then the flow goes to step Q21 where the spark is executed at the timing $\theta$Ig, and the control of the shift valve 25 is executed at step 22 as shown in FIG. 9.

When it is decided at step Q13 that it currently is not at the time of idling, then a basic spark timing, $\theta$B, is read in at step Q16 from a map formed and stored in advance using the numbers of engine revolutions and the amounts of intake air, for example, as parameters. At step Q17, a correction spark timing, $\theta$WT, corresponding to the correctin duty ratio Da in FIG. 9 is read in such a manner as corresponding to step Q5 of FIG. 7. Then at step Q18, a correction amount, $\theta$AT, is computed in accordance with temperatures of water or of intake air. A correction amount, $\theta$KN, for knocking is computed in a manner known per se at step Q19. Thereafter, at step Q20, the final spark timing $\theta$Ig is then computed by subtracting the knocking correction amount, $\theta$KN, from the sum of the basic spark timing, $\theta$B, the correction spark timing, $\theta$WT, and the correction amount, $\theta$AT. Then the process from step Q21 is executed.

Figure 11:
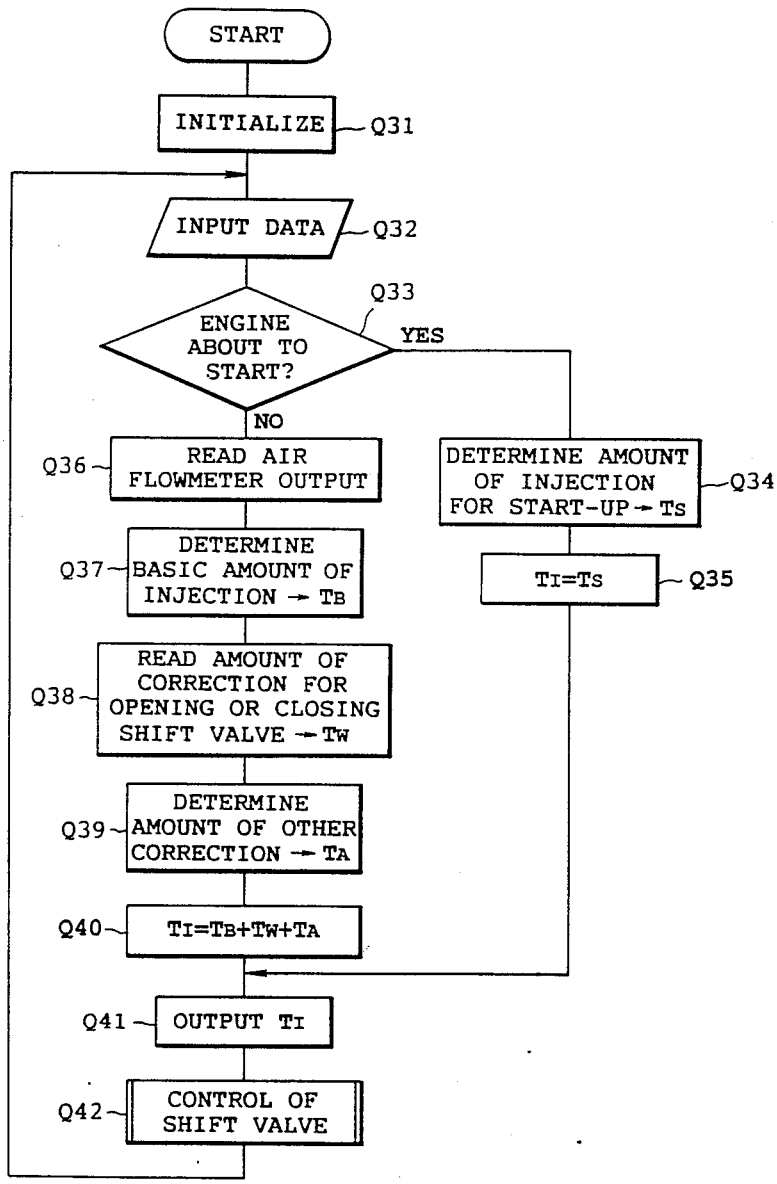
FIG. 11 is a flowchart showing a control example when the torque generated by the engine is changed by adjustment of amount of fuel to be fed.

3. Adjustment of Amounts of Fuel Feed (FIGS. 6, 9 & 11)

The torque generated by the engine may also be changed by adjusting the amounts of fuel to be fed in substantially the same manner as by adjusting the spark timings. More specifically, it is to be noted that a portion corresponding to the predetermined amount, $-A$ or $+A$, shown in FIG. 6, is an amount of fuel to be decreased or an amount of fuel to be increased, and that the duty ratio Da shown in FIG. 9 corresponds to a fuel injection pulse width as a correction amount on the basis of the amount of the fuel to be decreased or increased.

The adjustment of amounts of fuel to be fed will be described more in detail in conjunction with the flowchart of FIG. 11.

At step Q31, the whole system is initialized and, at step Q32, signals from a group of sensors 62 are read. Then at step Q33, it is distinguished whether or not the engine is in the process of start-up. If it is decided at step Q33 that it is in the process of start-up, namely an injection pulse, is to be injected for start-up, namely, an injection pulse, is read from a map involved at step Q34 and the amount Ts is set as a final injection pulse width, TI, at step Q35. Then the flow proceeds to step Q41 where the final injection pulse width TI is generated at a predetermined timing of injection and the control of the shift valve is executed at step Q42 in a manner as in FIG. 9.

If NO at step Q33, then signals of the amounts of intake air from the air flowmeter 13 are read at step Q36 and a basic fuel injection pulse width TB is decided from the amount of intake air and the number of engine revolutions at step Q37. Thereafter, at step Q38, there is read a correction injection pulse width TW—corresponding to the correctin duty ratio Da shown in FIG. 9, which corresponds to step Q5 in FIG. 7—attendant upon the switching of the shift valve 25. At step Q39, a pulse width TA for correction of water temperature, intake air temperature, battery voltage or the like is determined. Then the flow goes to step Q40 where the final injection pulse width, TI, is computed by adding the basic fuel injectin pulse width TB, the correction injection pulse width TW, and the pulse width TA. The flow then proceeds to step Q41 and the process from step Q41 is executed.

Change in Switching Speeds & Switching Characteristics of Shift Valve 25 (FIGS. 12-16)

Figure 12:
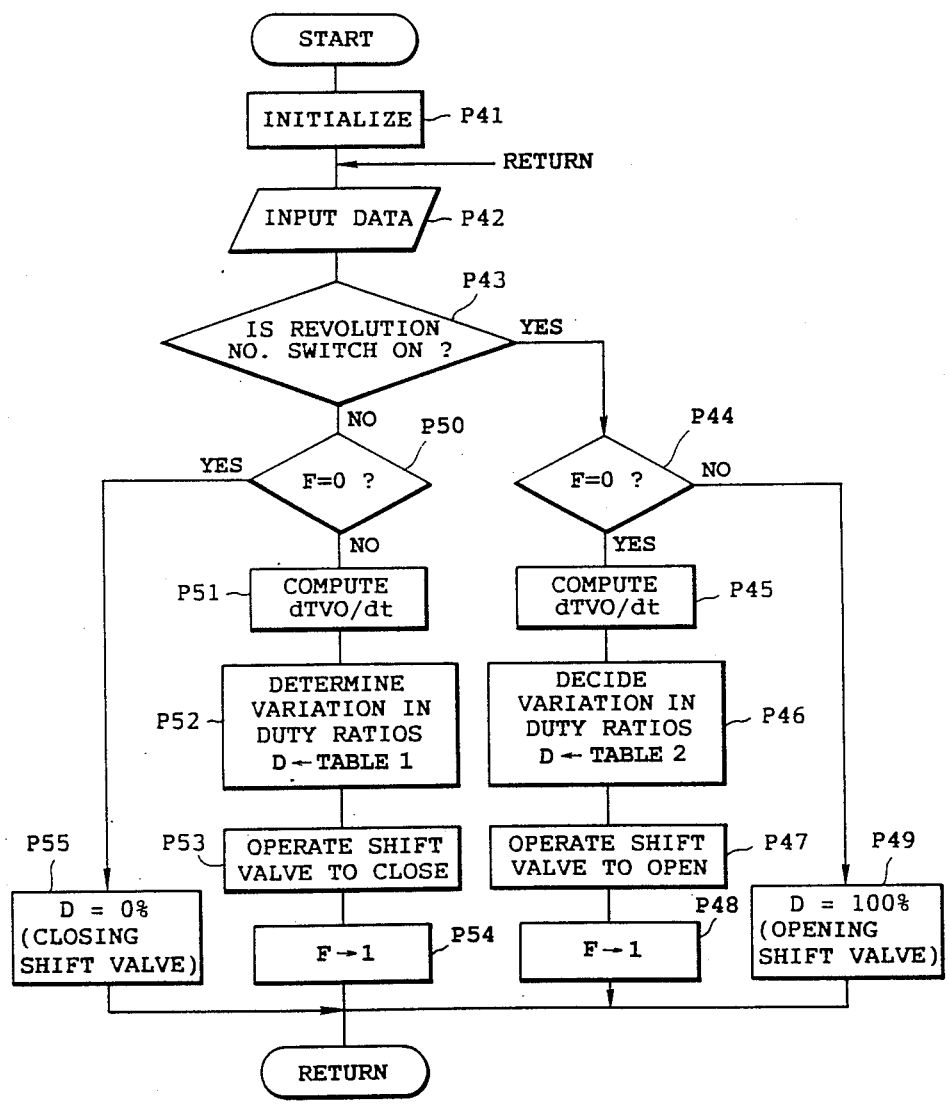
FIG. 12 is a flowchart showing a control example when the torque generated gradually by the engine is changed by adjustment of switching speeds of the shift valve.

1. Adjustment of Switching Speeds (Opening/Closing Speeds) of Shift Valve 25 (FIGS. 12-14)

The switching speeds of the shift valve 25, namely, the speeds at which the shift valve 25 is opened or closed, may be adjusted basically by gradually operating the shift valve 25 to open or close, thereby changing the pressures of the exhaust gases and preventing torque shock. A ratio in which the shift valve 25 is opened or closed is designed to change in accordance with a change rate (dTVO/dt) of a degree of opening of the throttle valve, a magnitude (TVO) of the degree of opening of the throttle valve, or a speed range of the transmission TS.

Figure 13:
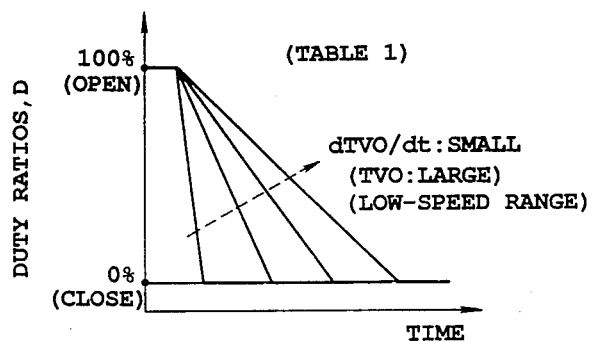
FIGS. 13 and 14 each is a graph showing an example in which a switching speed of the shift valve is changed.

FIG. 13 shows Table 1 indicating the relationship of duty ratios with an elapse of time when the shift valve 25 is switched from the open state to the closed state, the duty ratios being indicative of degrees of opening of the shift valve 25 with respect to the solenoid 27. FIG. 14 shows Table 2 indicating the relationship of duty ratios with an elapse of time when the shift valve 25 is switched from the closed state to the open state.

Figure 14:
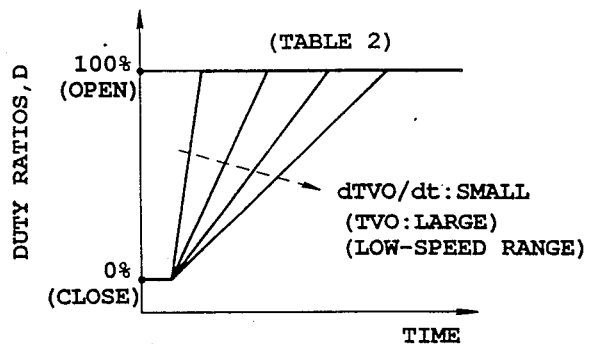

Referring to FIGS. 13 and 14, it is shown that the smaller the change rate of degrees of opening of the throttle valve, dTVO/dt, the slower the switching speed of the shift valve 25. A smaller change rate may be interpreted as demanding a smoother running of the vehicle so that the switching speed of the shift valve 25 is designed so as to be switched at a slower switching speed as the change rate gets smaller. Furthermore, as the larger the degree of throttle opening, TVO, the larger a degree of torque shock, so that the shift valve 25 is designed to allow its switching speed to get slower as the degree of opening of the throttle valve gets larger. It is also shown that, as torque shock is likely to occur as the speed range gets lower, the shift valve 25 is set to allow its switching speed to get delayed as the transmission TS is shifted to lower speed ranges.

The change of the switching speed of the shift valve 25 will be described in conjunction with the flowchart of FIG. 12, with the case of changing the change rate, dTVO/dt, of the degree of opening of the throttle valve taken as an example.

As shown in FIG. 12, the system is initialized at step P41 and data is entered at step P42. Then at step P43, it is decided whether or not the revolution number switch is ON, that is, whether or not the number of engine revolutions is larger than the number of engine revolutions sought to be shifted, Np.

When it is decided YES at step P43, the shift valve 25 is operated to open. The flow then goes to step P44 where it is distinguished whether or not a flage F is "0". That the flag F is zero means that the shift valve 25 is in a closed state. Thus, if it is decided NO at step P44, on the one hand, the shift valve 25 is already open so that the duty ratio for the solenoid 27 is set to 100% at step P49 in order to maintain the shift valve 25 in an open state and then the flow is returned. If YES at step P44, on the other hand, the shift valve 25 is in the closed state so that the change rate of the degree of throttle opening, dTVO/dt, is computed at step P45 in order to determine a speed at which the shift valve 25 is opened. Then at step P46, there is read a manner of changing, namely, how to change, the duty ratio D by comparing the change rate, dTVO/dt, with Table 2 in FIG. 14. Thereafter, the shift valve 25 is operated to open at step P47 so as to allow the switching speed to reach the speed of changing read in at step P46. And when the shift valve 25 is brought to full open, the flag F is set to "1" at step P48. The flow is then returned.

When it is decided NO at step P43, the shift valve 25 is operated to close. Then the flow proceeds to step P50 and, if it is decided NO at step P50, the process from step P50 to step P54 is executed in substantially the same manner as the process from step P45 to step P48. It is provided, however, that this process is to close the shift valve 25, the table to be compared at step P52 should be Table 1 as shown in FIG. 13 and that, if it is decided YES at step P50, the flow goes to step P55 where the duty ratio is set to 0% in order to maintain the shift valve 25 in the closed state.

2. Alteration of Switching Characteristics (FIGS. 15 & 16)

Figure 15:
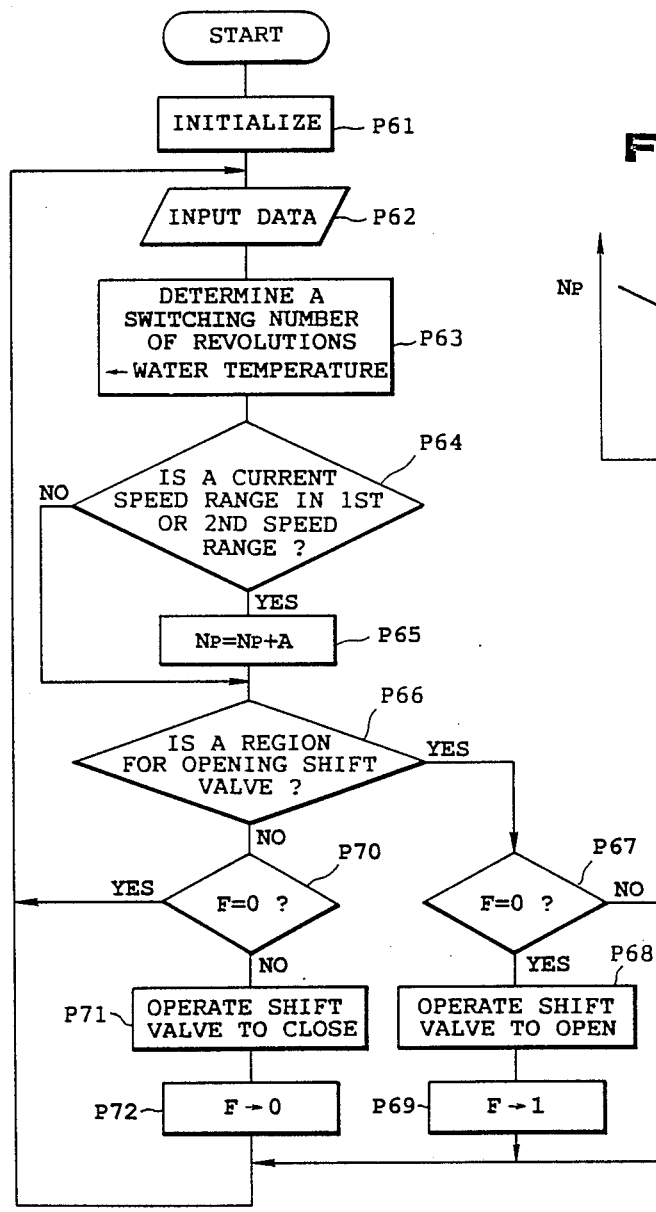
FIG. 15 is a flowchart showing a control example when a range in which the shift valve is opened or closed, or when a switching characteristic is changed.
Figure 16:
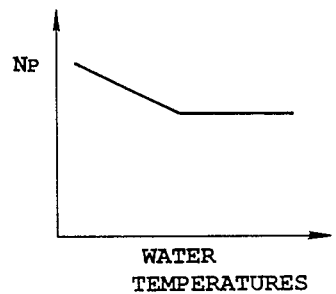
FIG. 16 is a view showing a map to be used for the control of FIG. 15.

FIGS. 15 and 16 show a control example by altering the switching characteristics of the shift valve 15, namely, by altering the ranges in which the shift valve 15 is in the open state or in the closed state, namely, the opening or closing range, in order to reduce opportunities, or a frequency, that the shift valve 15 is switched. In this embodiment, the opening or closing range is altered using both temperatures of cooling water for the engine and the speed range as parameters.

As shown in FIG. 15, the system is initialized at step P61 and data is input at step P62. Then at step P63, the number of engine revolutions to be shifted, Np, is set from a map as shown in FIG. 16. Referring to FIG. 16, it is shown that the number of engine revolutions to be shifted, Np, is set to get larger as water temperatures get lower when the water temperature is lower than a predetermined value—for example, 60° C. This enables the shift valve 25 to be switched at lesser frequency as the water temperature gets lower where the engine becomes unstable.

After step P63, it is decided at step P64 whether or not the current speed range is 1st or 2nd speed range. If YES at step P64, the number of engine revolutions, Np, is renewed at step P65 by adding a predetermined number of engine revolutions A (for example, 500 rpm) to the previously set number of engine revolutions, Np, and the flow goes to step P66. If it is decided at step P64 that the current speed range is neither in the 1st nor in the 2nd speed range, then the flow proceeds to step P66 without passing through step P65. This arrangement permits a decrease in the opportunities of the switching of the shift valve 25 by enlarging the number of engine revolutions to be shifted, Np, as a larger degree of torque shock is likely to occur because of a larger gear ratio as in the 1st speed range or in the 2nd speed range.

Then at step P66, it is decided whether or not the shift valve 25 is in the range in which it should be in an open state, that is, whether or not the number of engine revolutions is larger than the number of engine revolutions to be shifted, Np. If YES at step P66, the shift valve 25 should be operated to open. Thus the flow proceeds to step P67 where it is decided whether or not the flag F is set to 0 (zero). When the flag F is zero, it is meant that the shift valve 25 should be closed. Accordingly, if it is decided NO at step P67, the shift valve 25 is already open so that the flow is returned as it is. If YES at step P67, the shift valve 25 is operated to open at step P68 and the flag F is set to 1. The flow is then returned.

If it is decided NO at step P66, the flow then proceeds to step P70 where it is distinguished whether or not the flag F is set to "0". If YES at step P70, the shift valve 25 is already closed so that the flow is returned as it is. If it is decided NO at step P70, the shift valve 25 is operated to close at step P72 and then the flag F is set to 0 at step P73. Then the flow is returned.

Decrease in Efficiency of Torque Transmission of Driving System (FIGS. 17–24)

Figure 17:
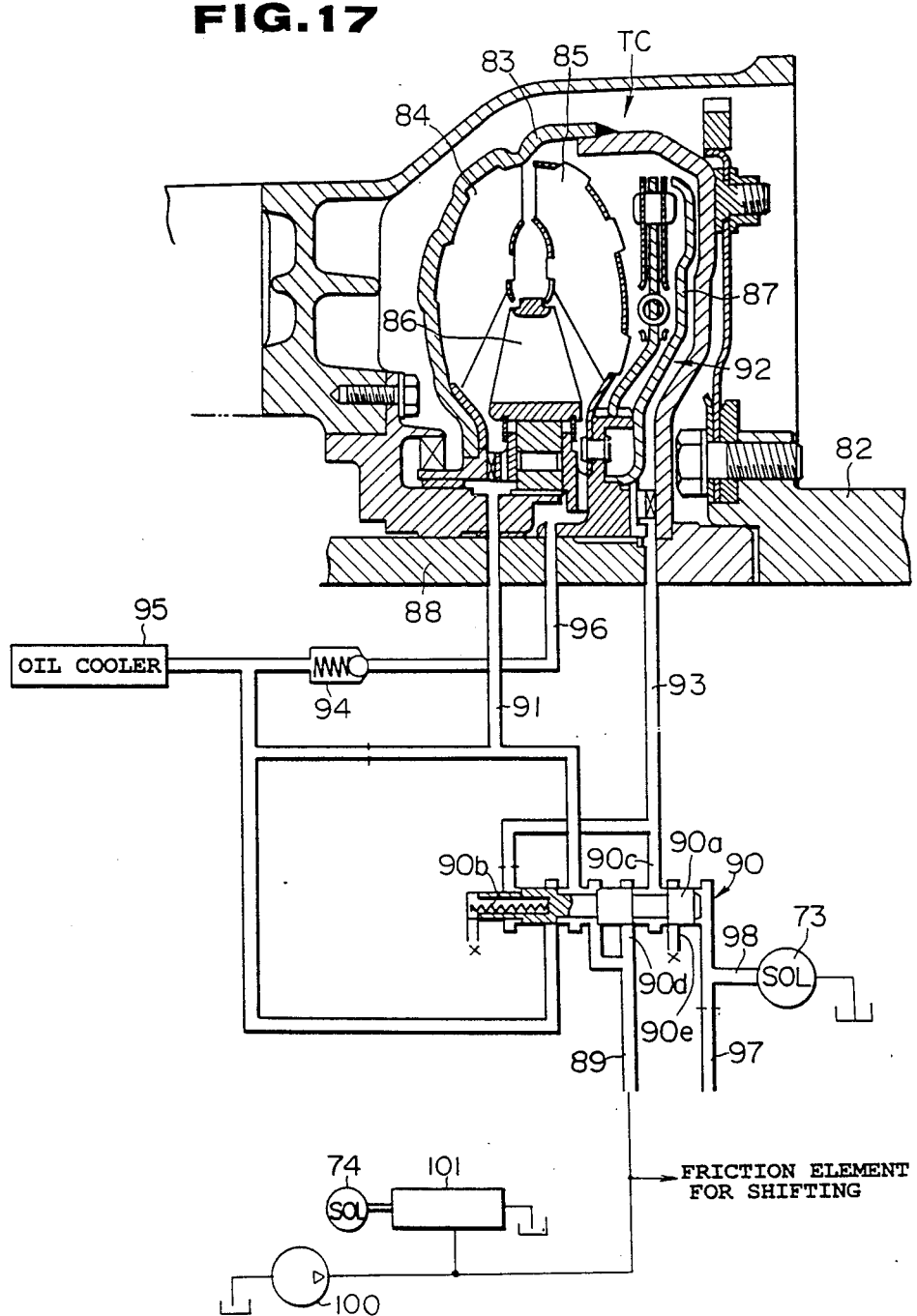
FIG. 17 is a cross-sectional view showing an example of a torque converter with a lockup clutch, together with an oil pressure circuit.

FIG. 17 shows a view showing the lockup torque converter and an oil pressure circuit for controlling the lockup torque converter. As shown in FIG. 17, the torque converter TC comprises a casing 83 connected to an output shaft 82 of the engine, a pump 84, a turbine 85, a stator 86, and a lockup clutch 87 interposed between the turbine 85 and the casing 83. The pump 84 is fixed to one innwe side portion inside the casing 83 so as to be rotatable integrally with the output shaft 82, and the turbine 85 is fitted rotatably to the other side portion inside the casing 83 facing the pump 84 so as to be rotatably drivable by rotation of the pump 84 through operating oil. The stator 86 is interposed between the pump 84 and the turbine 85, which is designed so as to increase torque when a ratio in speed of turbine revolutions to pump revolutions is equal to or below a predetermined value. The rotational force of the turbine 85 is generated by a turbine shaft 88 and transmitted to the multi-stage gearset mechanism TS. When the lockup clutch 87 is coupled with the casing 83 by means of connection to the turbine shaft 88, the output shaft 82 of the engine is connected to the turbine shaft 88 through the casing 83.

The lockup torque converter TC is fed with operating oil from an oil pan 100 through a main line 89 via a lockup valve 90 and a converter in-line 91. Pressures of the operating oil fed regularly urge the lockup clutch 87 in a direction in which it is coupled with the casing 83. A clearance 92 disposed between the lockup clutch 87 and the casing 83 is communicated with a line 93 for releasing the lockup led from the lockup valve 90, and the lockup clutch 87 is designed capable of being released when oil pressures are introduced into the clearance 92 from the lockup releasing line 93. To the lockup torque converter TC is connected a converter out-line 96 for forwarding operating oil to an oil cooler 95 through a pressure control valve 94.

The lockup valve 90 comprises a spool 90a and a spring 90b disposed so as to urge the spool 90a in the right-ward direction in FIG. 17. The lockup valve 90 is further provided with a port 90c connected to the line 93 for releasing the lockup, a pressure governing port 90d connected to the main line 89, and a drain port 90e. To a side portion of the lockup valve 90 on the right-hand side in FIG. 17 is connected a control line 97 that acts pilot pressure on the spool 97, and a drain line 98 branched from the control line 97 is mounted with the solenoid 73 (see FIG. 1) which in turn is operated to open or close the drain line 98 in accordance with an input signal. The pilot pressure is applied to the spool 90a of the lockup valve 90 in a direction opposite to the direction in which the spring 90b urges the spool 90a. At the same time, the spool 90a is urged by the lockup releasing pressure applied through the lockup releasing line 90 in the same direction as by the urging force of the spring 90b. Thus the spool 90a is allowed to move in accordance with a balance between the pilot pressure and the lockup releasing pressure, whereby the lockup releasing line 93 permits a communication with the main line 89 and the pressure governing port 90d or with the drain port 90e. It is to be noted herein that, assuming that the solenoid 73 is a duty solenoid, when a duty ratio reaches a maximum value, on the one hand, a drain amount from the control line 97 becomes maximal while the pilot pressure or the lockup releasing pressure becomes minimal, thus fully coupling the lockup clutch 87. When the duty ratio reaches a minimum value, on the other hand, the drain amount reaches a minimal while the pilot pressure or the lockup releasing pressure becomes maximal, thus fully releasing the coupling of the lockup clutch 87. If the duty ratio is in between the maximum value and the minimum value, the lockup clutch 87 is released or disengaged halfway.

The line pressure is fed through the main line 89. Pump pressure from the pump 100 is adjusted by a hydraulic valve 101 for line pressure which in turn is regulated, for example, by a duty solenoid valve 74 (see FIG. 1). The hydraulic valve 101 and the duty solenoid valve 74 may be designed to have substantially the same structures as the lockup valve 90 and the solenoid 73, respectively.

Figure 18:
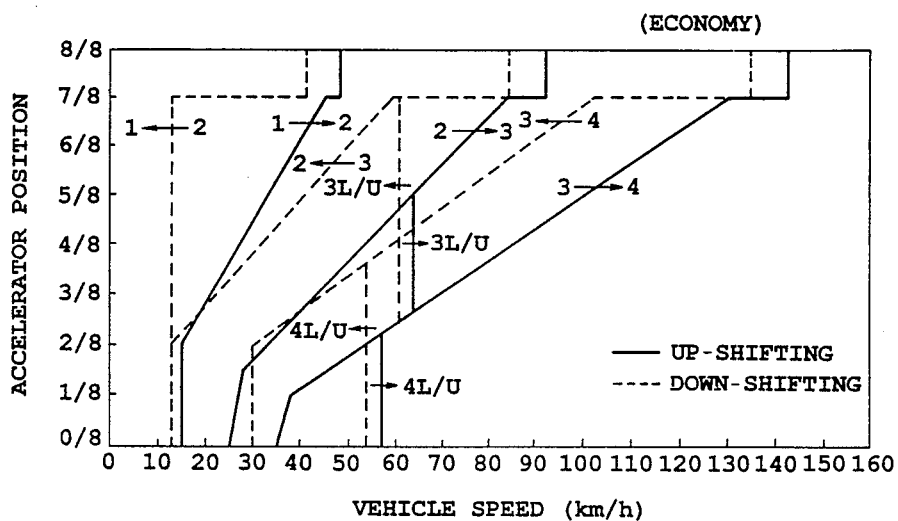
FIG. 18 is a characteristic view showing an example of a speed range shifting characteristic.
Figure 19:
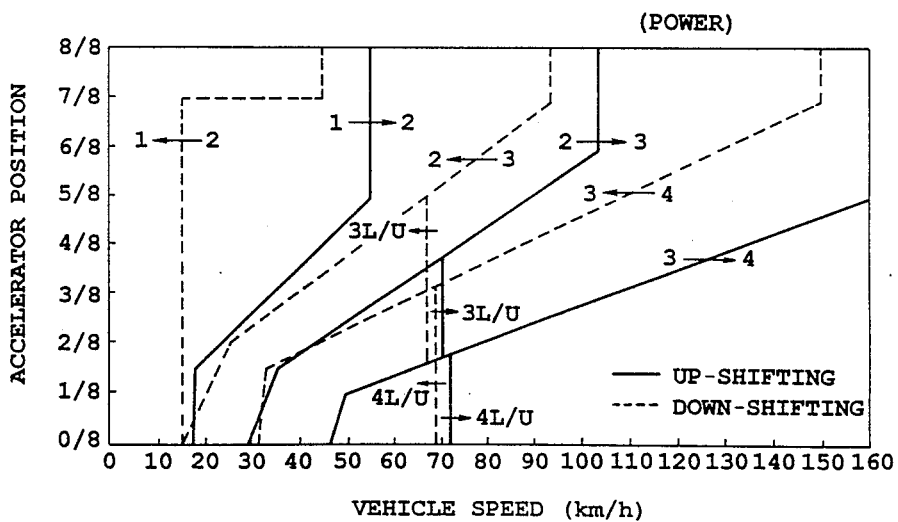
FIG. 19 is a characteristic view showing an example of a lockup characteristic.

The control unit 61 is designed to execute the shift control so as to be shifted to a desired speed range on the basis of shift characteristics, namely, lockup characteristics, as shown in FIG. 18 or FIG. 19. FIG. 18 shows the characteristics for economy mode, while FIG. 19 shows them for power mode. Either of the characteristics may be selected by a manual switch contained in a group of the sensors 62.

Figure 20:
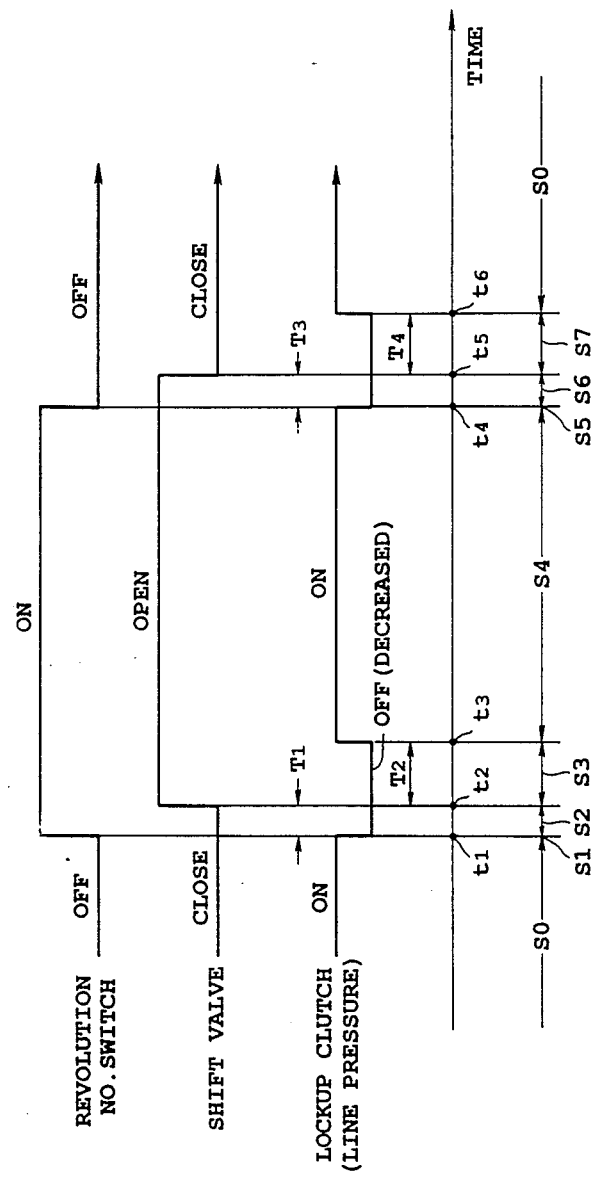
FIG. 20 is a time chart showing a control example in which the lockup clutch is released in association of the switching of the shift valve.

Referring now to FIG. 20, a manner of controlling the lockup clutch 87 attendant upon the switching of the shift valve 25 will be described. As shown as a time chart in FIG. 20, the control is basically executed by turning the lockup clutch 87 OFF or by releasing it when the shift valve 25 is switched. It is to be noted, however, that, with responsiveness taken into consideration, the lockup clutch 87 is disengaged (when the time t1 or t4 has elapsed) before the shift valve 25 is switched (prior to a predetermined period of time T1 or T3). Thereafter, the shift valve 25 is operated to switch at the point of time t2 or t5. In the predetermined period of time T2 or T4 after the shift valve 25 has been switched, namely, after the time t3 or t6 has elapsed, the lockup clutch 87 is engaged again. The foregoing description immediately above is applicable to the case where the lockup clutch 87 is connected on the basis of the lockup characteristics as shown in FIG. 18 or FIG. 19 at the time of the switching of the shift valve 25. When the lockup clutch 87 is disconnected on the basis of the lockup characteristics at the time of the switching of the shift valve 25, no further procedures are required. In this case, however, a more effective prevention of torque shock attendant upon the switching of the shift valve 25 may be attained by changing the torque generated by the engine as have been described hereinabove, on top of a change in the switching speeds of the shift valve 25.

More specifically, as shown in FIG. 20, in the stage S0 ranging until the time t1 has elapsed, the lockup clutch 87 is ON while the revolution number switch is OFF and the shift valve 25 is in a closed state. At the stage S1 where the time reaches the point t1, when the switch is turned ON while the shift valve 25 is still in the closed state, the line pressure to be applied to the lockup clutch 87 is reduced straight down and the lockup clutch 87 is turned off. During a predetermined period of time T1 ranging from the point of time t1 to t2, namely, during the stage S2, the shift valve 25 is still maintained at the closed state while the line pressure is held to a decreased level. At the end of the stage S2, namely, at the point of time t2, the shift valve 25 is switched from the closed state to the open state. Then at the point of time t3 in a predetermined period of time T2 ranging from the point of time t2 to t3, namely, in the stage S3, the line pressure applied to the lockup clutch 87 is raised straight up by turning the lockup clutch 87 ON. This state continues in the stage S4 until the time t4 has elapsed. At the point of time t4, namely, at the stage S5, when the revolution number switch is turned OFF and the lockup clutch 87 is turned OFF, the line pressure is reduced again straight down. In the stage S6 ranging from the point of time t4 to t5, namely, in a predetermined period of time T3, the shift valve 25 is still held in the open state. At the point of time t5, the shift valve 25 is turned OFF while both the revolution number switch and the lockup clutch 87 are already OFF. In the stage S7 ranging from the time t5 to t6, namely, in a predetermined period of time T4, this state continues, and then the line pressure is returned to the original level by turning the pickup clutch 87 ON while the switch and the shift valve 25 are held in the same manner as in the stage S6. Then the stage is returned to S0.

Figure 21:
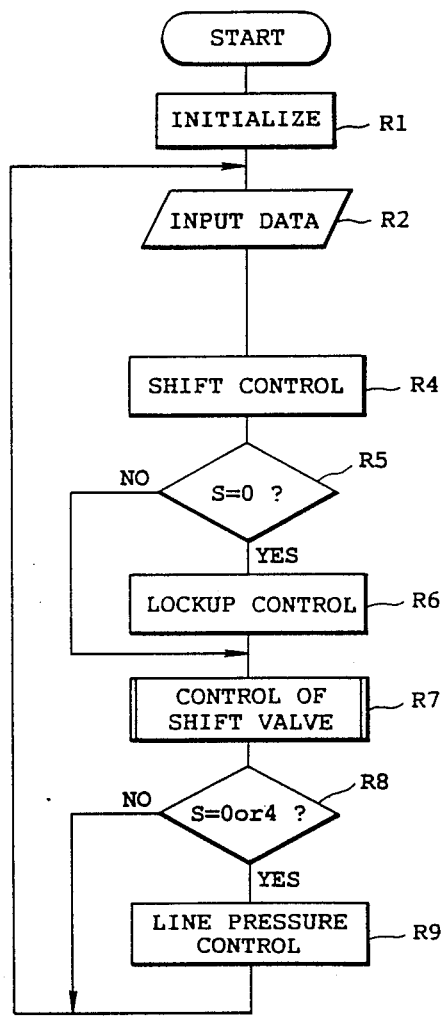
FIGS. 21 and 22 each is a flowchart showing a control content of the time chart of FIG. 20.
Figure 22:
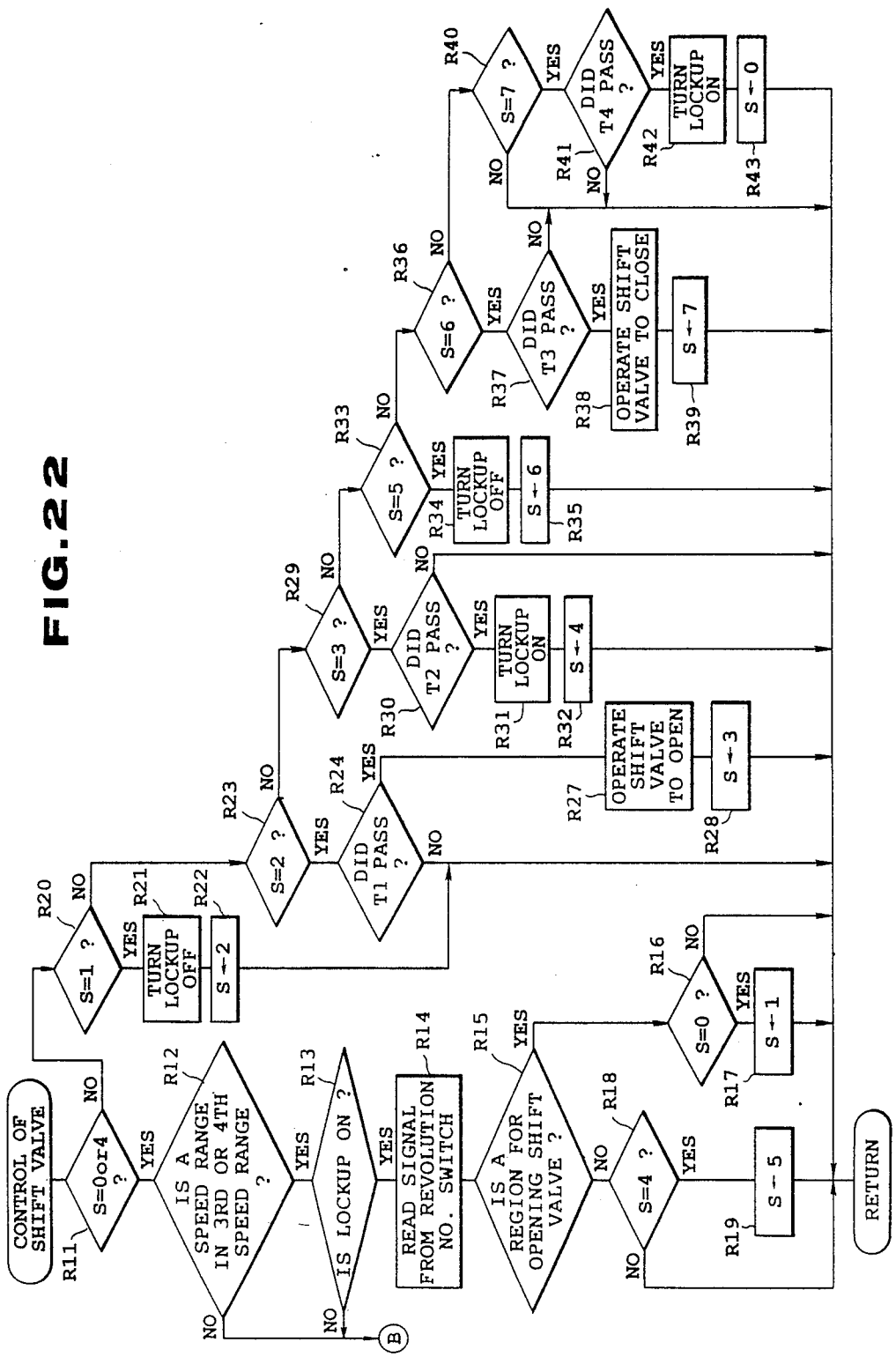
Figure 23:
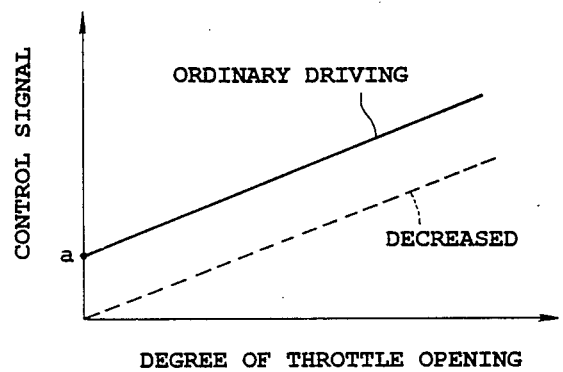
FIG. 23 is a view showing a map to be used for the control of FIG. 20.
Figure 24:
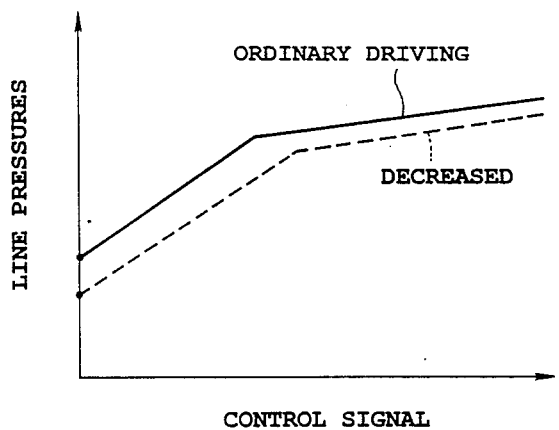
FIG. 24 is a view showing a map to be used for the control of FIG. 21.

The detail of the control corresponding to the time chart of FIG. 20 will be described in conjunction with the flowcharts as shown in FIGS. 21 and 22.

Referring to FIG. 21, the system is initialized at step R1 and the stage is set to S0. Then signals from a group of sensors 62 are read at step R2 and the shift control is executed at step R4 to realize the switching characteristics of FIG. 18 or FIG. 19.

After step R4, it is decided at step R5 whether or not the stage is S0. If YES at step R5, the flow proceeds to step R6 because the initial stage is S0 and, at step R6, the lockup control is executed by realizing the lockup characteristics of FIG. 18 or 19. Thereafter, the shift valve 25 is controlled at step R7 in such a manner as will be described hereinbelow. Then at step R8, it is distinguished whether or not the current stage is S0 or S4. If YES at the decision process R8, the line pressure control is executed at step R9. The line pressure control is to allow the line pressure to become a value corresponding to a degree of opening of the throttle valve as have been done in a conventional manner. More specifically, a control signal is read so as to correspond to a degree of throttle opening on the basis of the characteristic line of the ordinary control indicated by the solid line in FIG. 24. Then, a value of the control signal is generated to the solenoid 74 for the line pressure control, thus generating the line pressure at the time of ordinary control as shown by the solid line in FIG. 24.

If it is decided NO at step R5, the flow proceeds to step R7 without passing through the step R6, the process from step R7 to step R9 is executed. And if NO at step R8, the flow is returned to step R2 as it is without passing through step R9.

The control at step R7 in FIG. 21 will be executed on the basis of the flowchart as shown in FIG. 22.

Referring to FIG. 22, it is distinguished at step R11 whether or not the current stage is S0 or S4. If it is decided YES at step R11, the flow proceeds to step R12 and it is then distinguished at step R12 whether or not the current speed range is 3rd or 4th speed range. If YES at step R12, it is furthermore distinguished at step R13 whether or not the lockup is ON. If it is decided at step R13 that the lockup is ON, the flow goes to step R15 where a signal from the revolution number switch is read. Thereafter, at step R15, it is decided whether or not the shift valve 25 is in a region where it should be operated to open. If YES at step R15, the flow proceeds to step R16 where it is further distinguished whether or not the current stage is S0. If it is decided at step R 16 that the current stage is S0, then the stage is set to S1 at step S17. If NO at step R16, the flow is returned as it is.

At step R15, when it is decided that the shift valve 25 is not in a region where it should be open, it is then decided whether or not the current stage is S4 at step R18. If YES at step 18, then the flow goes to step R19 where the current stage is set to S5, while, if NO at step 18, the flow is returned as it is.

If it is decided at step R11 that the current stage is neither S0 nor S4, the current stage is then distinguished whether or not to be S1 at step R20. If YES at step R20, it is the point of time t1 as shown in FIG. 20 so that the lockup clutch 87 is turned OFF at step R21 and the current stage is set to S2, then returning the flow.

At step R20, it is decided that the current stage is not S1, then the flow goes to step R23 where it is further distinguished whether or not the current stage is S2. If YES at step 23, it is then decided at step R24 whether or not the predetermined period of time T1 has passed, in order to confirm that the time runs at the point of time t2 as shown in FIG. 20. If NO at step R24, the flow is returned as it is. If it is decided at step R24 that the time T1 has passed, then the shift valve 25 is operated to open at step R27 and the current stage is set to S3 at step R28. Thereafter, the flow is returned.

At step R23, it is decided that the current stage is not S2, then the flow goes to step R29 and it is further decided whether or not the current stage is then S3. If YES at step R30, it is then judged at step R30 whether or not the predetermined period of time T2 has elapsed. If YES at step R30, it is meant that the time reaches at the point of time t3 as shown in FIG. 20, so that the next process R31 is executed to turn the lockup clutch 87 ON and the current stage is set to S4 at step R32. The flow is then returned. If it is decided NO at step R30, then the flow is returned as it is.

When it is decided at step R29 that the current stage is not S3, it is then distinguished at step R33 whether or not the current stage is S5 in order to determine the point of time when the shift valve 25 is operated to close. In other words, it is confirmed whether or not the time runs at the point of t4 as shown in FIG. 20. If YES at step R33, the process is executed at step R34 to turn the lockup clutch 87 OFF and the current stage is set to S6 at step R35, then returning the flow.

If it is decided NO at step R33, it is furthermore distinguished at step R36 whether or not the current stage is S6. If YES at step R36, it is thus confirmed that the time runs at the point of time t6 so that the flow goes to step R37 where it is then decided whether or not the predetermined period of time T3 has passed in order to confirm whether the time runs at the point of time t5 as shown in FIG. 20. If YES at step R37, the shift valve 25 is operated to close at step R38 and the current stage is set to S7 at step R39. Then the flow is returned. If it is decided NO at step P37, the flow is returned as it is in order to allow the time to run for the predetermined period of time T3.

If it is decided at the process R36 that the current stage is not S6, thus it is judged at step R40 whether or not the current stage is then S7. If YES at step R40, it is decided at step R41 whether or not the predetermined period of time T4 has passed in order to confirm whether the time runs at the point of time t6 as shown in FIG. 20. If YES at step R41, it is meant that the time reaches at the point of time t6 so that the lockup clutch 87 is turned ON at step R42. After the current stage is set to S0 at step R42, the flow is returned. If it is decided NO at either of the decision process R40 or R41, the flow is then returned as it is and the predetermined period of time T4 is allowed to run.

It is to be noted that, when it is decided NO either at step R12 or at step R13, it is meant that the lockup clutch 87 is already turned OFF so that the system is returned as it is. As have been described hereinabove, it is to be understood in this case that torque shock may be reduced all the more by changing the torque generated by the engine or by changing the operating characteristics of the shift valve 25.

It is further to be noted that, although in the above embodiments the control against the solenoid 73 is executed by turning the lockup clutch 87 on or off, the control may be executed by altering a degree of the coupling of the lockup clutch 87 by bringing the line pressure into a higher or lower level. In this case, the timings of increasing or decreasing the line pressures may be set in substantially the same manner as the timings of turning the lockup clutch 87 on or off as shown in FIG. 20. The line pressures are increased or decreased by fully engaging or disengaging, or turning on or off, the lockup clutch 87, respectively, however, it is also possible to release the lockup clutch 87 in a halfway state. At this end, each of the characteristic lines may be set smaller than in ordinary case, as shown by the broken lines in FIGS. 23 and 24. The halfway state of the lockup clutch 87 is preferred in terms of preventing shock likely to occur when the lockup clutch 87 is turned on or off—particularly, when it is turned on. It is to be noted that the control of the lockup clutch 87 in the halfway state may be made by controlling the solenoid 73 using a solenoid, for example, of the type of duty control.

If no lockup clutch is fitted, it is also possible to execute the control by reducing a coupling force of friction coupling elements to be used for shifting speed ranges.

Variants in Exhaust Systems

FIGS. 25 to 29 shows a variation in exhaust systems.

Referring now to FIG. 25, a passageway 101 is mounted from the upstream side to the downstream side with a catalyst converter 113A, a secondary silencer 112A, and a primary silencer 111A in this order.

Figure 26:
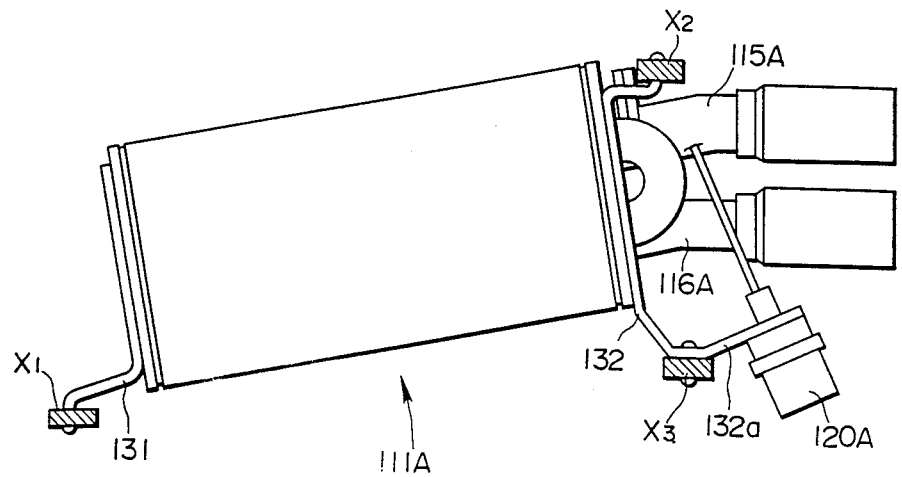
FIG. 26 is an enlarged side view showing a silencer shown in FIG. 25.

As shown in FIG. 26, the primary silencer 111A is fixed through brackets 131 and 132 inside the vehicle body at points X1, X2, and X3. Although the primary silencer 111A may be fixed at the two points X1 and X2, disposed diagonally with each other, it is preferred that it is fixed at the three points as shown in FIG. 26 in order to complete with vibration of the engine.

Figure 27:
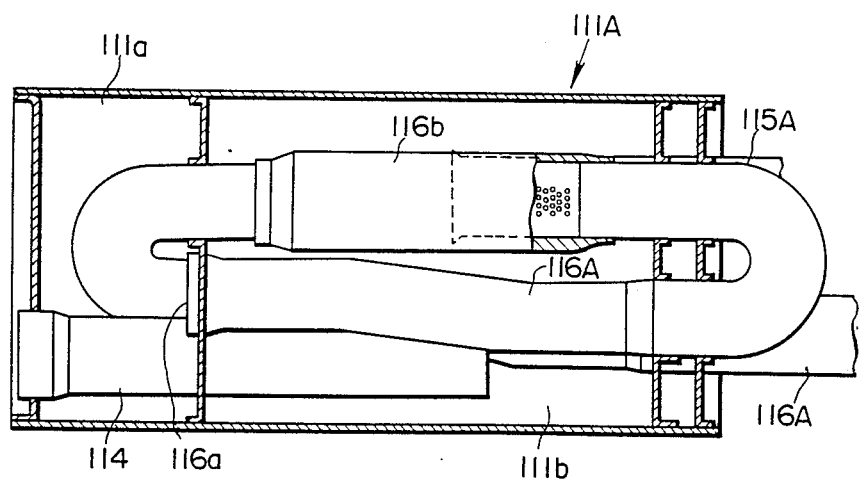
FIG. 27 is a view showing an interior structure of the silencer shown in FIG. 25.

Referring now to FIG. 27, the inside of the primary silencer 111A is divided into two chambers, one being a resonance chamber 111a and the other being an expansion chamber 111b, which are communicated with each other through a through hole (not shown) provided on a partition interposed between the resonance chamber 111a and the expansion chamber 111b, respectively. The expansion chamber 111b is communicated with the outside of the resonance chamber 111a through and exhaust inlet tube 114 arranged within the primary silencer 111A passing through the resonance chamber 111a and with the outside of the expansion chamber 111b through a first exhaust outlet tube 115A which is arranged virtually in parallel to the axis of the exhaust inlet tube 114. The resonance chamber 111a is communicated with the outside of the primary silencer 111A on the side of the expansion chamber 111b through a second exhaust outlet tube 116A that in turn is designed so as to be smaller in diameter than the first exhaust outlet tube 115A. The second exhaust outlet tube 116A is arranged within the primary silencer 111A in such a manner that one end 116a of the tube 116A has an opening in the resonance chamber 111a and the tube body is curved in a largely S-shaped manner in order to provide a passage over a full length of the primary silencer 111A. A sound absorbing chamber 116b filled with a sound absorbing material is provided at a middle portion of the second exhaust outlet tube 116A located on the length of the expansion chamber 111b.

Figure 28:
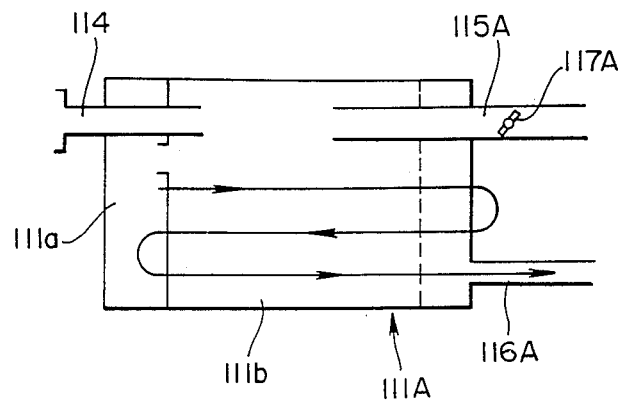
FIG. 28 is a diagram showing a manner of a flow of exhaust gases through the silencer shown in FIG. 25.

FIG. 28 is a diagram showing flow routes of the exhaust gases within the primary silencer 111A. A passage of the exhaust gases within the primary silencer 111A comprises a short passage through which the exhaust gases flown into the expansion chamber 111b of the primary silencer 111A through the exhaust inlet tube 114 are withdrawn from the expansion chamber 111b through the first exhaust outlet tube 115A toward the outside of the primary silener 111A and a long passage through which the exhaust gases flown into the resonance chamber 111a from the expansion chamber 111b are then withdrawn through the second exhaust outlet tube 116A designed so as to be in a largely S-shaped manner ranging three times over a full length of the expansion chamber 111b. During passage through the second exhaust outlet tube 116A, the exhaust gases pass through the sound absorbing chamber 116b where sound is deaden.

Figure 29:
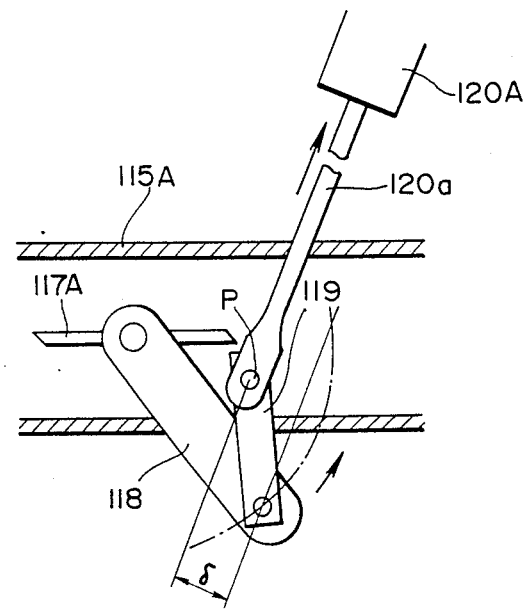
FIG. 29 is a view showing a detail of a shift valve mounted in the silencer shown in FIG. 25.

Turning now to FIG. 29, it is shown that a shift valve 117A is mounted in the first exhaust outlet tube 115A. The shift valve 117A is connected to a first link 118A that in turn is pivotably connected to a second link 119A. The second link 119A is further connected pivotably at a pivotal center P to a connecting rod 120a connected further to an actuator 120A. The shift valve 117A is allowed to pivot by pushing down or pulling up the connecting rod 120a, thus opening or closing the first exhaust outlet tube 115A. It should be noted herein that a pivotal center at which the first link 118A is pivoted with respect to the second link 119A is designed so as to deviate from the center line of the connecting rod 120a passing through the pivotal center P in a range where the connecting rod 120a is allowed to push down or pull up. In other words, as shown in FIG. 29, when the shift valve 117A is in a full open state, the pivotal center P is deviated from the pivotal center of the second link 119A against the first link 118A by a degree, δ.

Referring back to FIG. 26, the actuator 120A is fixed to the primary silencer 111A through a mounting 132a extending from a bracket 132 and connected through an exhaust passageway 122 to the air intake passage of the engine downstream of the throttle valve. The actuator 120A is operated by a negative pressure of intake air. The exhaust passageway 122 is mounted with a three-way solenoid valve 123A connected to an ECU 124 that in turn is designed to regulate operation of the actuator 120A for opening or closing the shift valve 117A by opening or closing the branch exhaust passageway 122 with the three-way solenoid valve 123A.

The shift valve 117A is designed to be opened or closed using the number of engine revolutions as a parameter in such a manner that it is closed at a low rpm of the engine while it is opened at a high rpm thereof. Furthermore, the shift valve 117A is open in a range where the number of engine revolutions is about to idle. It is closed in a medium rpm range of the engine while it is opened in a high rpm range thereof.

In order to reduce or prevent torque shock that may be caused upon the switching of the shift valve 117A, the change in torque generated by the engine is also controlled.

Although the present invention has been described by way of examples, it should be interpreted that it is not restricted to the above embodiments and that, for example, the following embodiments be encompassed within the scope of the present invention without departing from the spirit thereof.

As a parameter for switching the shift valve 25, an engine load—for example, an amount of intake air—may be used in place of the number of engine revolutions. It is also possible to use both the number of engine revolutions and the engine load.

More than two silencers may be fitted. In instances where three silencers are used, for example, a third branch exhaust passageway may be disposed in parallel to the first and second branch exhaust passageways 21A and 21B and provided with a third silencer while the shift valve 25 is fitted in the first branch exhaust passageway 22A only. The third branch exhaust passageway may be further provided with a second shift valve. In this case, a condition where the two shift valves are switched—for example, the number of engine revolutions—may be changed and the exhaust gases may be withdrawn in three modes: a first mode being to withdraw them through the first branch exhaust passageway only, a second mode through both the first and second branch exhaust passageswasy, and a third mode through all the three branch exhaust passageways.

Furthermore, the torque generated by the engine may be changed, for example, on the basis of the basic throttle characteristic as shown in FIG. 4, that is, on the basis of an amount of intake air, in place of those described with respect to the above embodiments.

As is apparent from the foregoing description, the engine-control apparatus according to the present invention reduces or little causes torque shock attendant upon the switching of the flow of the exhaust gases when the flow of the exhaust gases is switched so as to change the pressure of the exhaust gases.

In particular, in instances where torque shock is designed so as to be reduced by changing the torque generated by the engine or by reducing the transmission efficiency of torque of the driving system, the control conditions can be satisfied merely by mounting a shift valve and its accessories on top of the existing parts and devices so that t is extremely ecomical because the existing ones can be used efficiently as they are.

Furthermore, in instances where the switching speed or the switching characteristics of the shift valve are designed to be altered, no addition is required to control conditions for the existing parts and devices and a control condition can be designed for controlling the shift valve only without changing the control conditions designed for the existing ones.

It is further to be noted that the supercharger may be of the type drivable mechanically by means of an output shaft of the engine, on top of the exhaust turbo type as shown in FIG. 1.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An engine-control apparatus comprising:
   a plurality of sound deadening passages mounted on an exhaust passageway of an engine;
   a shift valve mounted on the exhaust passageway and adapted to switch a flow of exhaust gases between a first state and a second state by changing the flow of exhaust gases through at least a portion of the plurality of the sound deadening passages, the first state being a state in which pressure of the exhaust gases is decreased and the second state being a state in which pressure of the exhaust gases is increased;
   a switching control means for controlling the switching of the shift valve on the basis of a predetermined switching characteristic in accordance with a state of running the engine; and
   a torque regulating means for regulating a change in torque to be transmitted to a driven wheel at the time of switching the shift valve by the switching control means.

2. An engine-control apparatus as claimed in claim 1, wherein the torque regulating means is arranged to regulate the change in torque generated by the engine.

3. An engine-control apparatus as claimed in claim 2, wherein:
   the engine is provided with a supercharger for charging an intake air; and
   the torque regulating means is arranged to regulate pressure by the supercharger.

4. An engine-control apparatus as claimed in claim 2, wherein the torque regulating means is arranged to regulate a spark timing of the engine.

5. An engine-control apparatus as claimed in claim 2, wherein the torque regulating means is arranged to regulate an amount of fuel to be fed to the engine.

6. An engine-control apparatus as claimed in claim 1, wherein the torque regulating means is arranged to change a switching speed at which the shift valve is switched on the basis of a state in which a vehicle runs.

7. An engine-control apparatus as claimed in claim 6, wherein the torque regulating means is arranged to regulate the switching speed on the basis of a change rate at which a degree of throttle opening is changed.

8. An engine-control apparatus as claimed in claim 6, wherein the torque regulating means is arranged to regulate the switching speed on the basis of a magnitude of the degree of throttle opening.

9. An engine-control apparatus as claimed in claim 6, wherein the torque regulating means is arranged to regulate the switching speed on the basis of a speed range of a transmission.

10. An engine-control apparatus as claimed in claim 1, wherein the torque regulating means is arranged to reduce an efficiency of torque transmission of a driving system interposed between the engine and the driven wheel.

11. An engine-control apparatus as claimed in claim 10, wherein the efficiency is reduced by releasing a lockup clutch of a torque converter disposed with the driving system.

12. An engine-control apparatus as claimed in claim 11, wherein the torque regulating means further regulates the change in torque generated by the engine when the lockup clutch satisfies a condition for releasing on the basis of a predetermined lockup characteristic at the time of switching the shift valve.

13. An engine-control apparatus as claimed in claim 12, wherein the torque regulating means is arranged to regulate the change in torque generated by the engine by regulating a spark timing of the engine.

14. An engine-control apparatus as claimed in claim 11, wherein the torque regulating means further regulates the switching speed of the shift valve when the lockup clutch satisfies a condition for releasing at the time of switching the shift valve.

15. An engine-control apparatus comprising:
    a plurality of sound deadening passages mounted on an exhaust passageway of an engine;
    a shift valve mounted on the exhaust passageway and adapted to switch a flow of exhaust gases between a first state and a second state by changing the flow of exhaust gases through at least a portion of the plurality of the sound deadening passages, the first state being a state in which at least pressure of the exhaust gases is decreased and the second state being a state in which the pressure of the exhaust gases is increased;
    a switching control means for controlling the switching of the shift valve on the basis of a predetermined switching characteristic in accordance with a state of running the engine; and
    a switching regulating means for regulating the switching of the shift valve prior to the predetermined switching characteristic in accordance with a state in which a vehicle runs.

16. An engine-control apparatus as claimed in claim 15, wherein the switching regulating means is arranged to change a range to be determined by the switching characteristic, the range being in which the shift valve opens or closes.

17. An engine-control apparatus as claimed in claim 16, wherein the switching characteristic is changed by the switching regulating means on the basis of a temperature of water for cooling the engine.

18. An engine-control apparatus as claimed in claim 16, wherein the switching characteristic is changed by the switching regulating means on the basis of a speed range of a transmission.

19. An engine-control apparatus as claimed in claim 1 or 15, wherein the switching characteristic is set at least on the basis of engine speed as a parameter.

20. An engine-control apparatus as claimed in claim 19, wherein:
    the exhaust passageway is provided with two sound deadening passages arranged in parallel to each other; and one of the two sound deadening passages is provided with a silencer for high speed of the engine while the other is provided with a silencer for low speed thereof.

21. An engine-control apparatus as claimed in claim 19, wherein:
a silencer connected to the exhaust passageway is provided with two outlets for withdrawing exhaust gases as sound deadening passages; and
the shift valve is operated to open or close one of the two outlets.

* * * * *